US012731333B2

(12) United States Patent
Wannerberg

(10) Patent No.: US 12,731,333 B2
(45) Date of Patent: Sep. 8, 2026

(54) GAZE-BASED AUDIO SWITCHING AND 3D SIGHT LINE TRIANGULATION MAP

(71) Applicant: Adeia Guides Inc., San Jose, CA (US)

(72) Inventor: Petter Wannerberg, Lidingö (SE)

(73) Assignee: Adeia Guides Inc., San Jose, CA (US)

( * ) Notice: Subject to any disclaimer, the term of this patent is extended or adjusted under 35 U.S.C. 154(b) by 66 days.

(21) Appl. No.: 18/592,224

(22) Filed: Feb. 29, 2024

(65) Prior Publication Data

US 2025/0278892 A1 Sep. 4, 2025

(51) Int. Cl.

| | |
|---|---|
| ***G06T 17/05*** | (2011.01) |
| ***G06F 3/01*** | (2006.01) |
| ***G06T 7/20*** | (2017.01) |
| ***G06T 7/579*** | (2017.01) |
| ***G06T 7/70*** | (2017.01) |
| ***G06T 17/20*** | (2006.01) |

(52) U.S. Cl.

CPC .............. *G06T 17/05* (2013.01); *G06F 3/013* (2013.01); *G06T 7/20* (2013.01); *G06T 7/579* (2017.01); *G06T 7/70* (2017.01); *G06T 17/20* (2013.01); *G06T 2207/30241* (2013.01); *G06T 2210/21* (2013.01)

(58) Field of Classification Search

CPC ........... G06T 17/05; G06T 7/579; G06T 7/70; G06T 7/20; G06T 17/20; G06T 2207/30241; G06T 2210/21; G06F 3/013

USPC .......................................................... 345/420

See application file for complete search history.

(56) References Cited

U.S. PATENT DOCUMENTS

| | | | |
|---|---|---|---|
| 9,288,387 | B1 | 3/2016 | Keller |
| 9,384,737 | B2 | 7/2016 | Lamb et al. |
| 9,554,229 | B2 | 1/2017 | Ek et al. |
| 9,621,953 | B1 | 4/2017 | Holcomb et al. |
| 10,205,988 | B1 | 2/2019 | Waterman et al. |
| 10,904,615 | B2 | 1/2021 | Boss et al. |
| 11,619,991 | B2 | 4/2023 | Kelly et al. |
| 11,747,899 | B2 | 9/2023 | Chen et al. |
| 2005/0175218 | A1 | 8/2005 | Vertegaal et al. |

(Continued)

OTHER PUBLICATIONS

Dhananjay Lal, et al., “Methods and Systems for Combined Voice and Gesture Control”, (U.S. Appl. No. 18/203,170, filed May 30, 2023).

(Continued)

*Primary Examiner* — Hai Tao Sun
(74) *Attorney, Agent, or Firm* — HG LAW LLP

(57) ABSTRACT

Systems and methods of gaze-based switching of audio components of content streams are disclosed. A first audio/video stream is provided to a first device of a first user. A second audio/video stream is provided to a second device of a second user. Based on determining that the gaze of the second user is directed to a display of the first device, the system pauses the second audio/video stream at the second device and causes an audio portion of the first audio/video stream to be played at the second device. The gaze can be determined by maintaining and modifying a 3D gaze map of an environment indicating the real-time 3D locations of the user and target object of the user's gaze. The 3D gaze map is updated based on cross-referencing video feeds of position data of the user and the target object and of gaze data of the user captured by a plurality of camera devices.

20 Claims, 16 Drawing Sheets

(56) References Cited

U.S. PATENT DOCUMENTS

| | | | |
|---|---|---|---|
| 2006/0082542 | A1 | 4/2006 | Morita et al. |
| 2006/0140420 | A1 | 6/2006 | Machida |
| 2011/0069940 | A1 | 3/2011 | Shimy et al. |
| 2011/0185437 | A1 | 7/2011 | Tran et al. |
| 2012/0060176 | A1 | 3/2012 | Chai et al. |
| 2012/0311635 | A1 | 12/2012 | Mushkatblat |
| 2013/0036200 | A1 | 2/2013 | Roberts et al. |
| 2013/0135196 | A1 | 5/2013 | Park et al. |
| 2013/0159876 | A1 | 6/2013 | Narasimhan et al. |
| 2013/0259312 | A1 | 10/2013 | Lyons et al. |
| 2014/0068692 | A1 | 3/2014 | Archibong et al. |
| 2014/0282721 | A1 | 9/2014 | Kuncl et al. |
| 2014/0362201 | A1 | 12/2014 | Nguyen et al. |
| 2015/0033266 | A1 | 1/2015 | Klappert et al. |
| 2015/0082136 | A1 | 3/2015 | Cameron et al. |
| 2015/0244747 | A1 | 8/2015 | Wickenkamp et al. |
| 2015/0319400 | A1* | 11/2015 | Golyshko ............ H04N 21/812 386/230 |
| 2016/0212465 | A1 | 7/2016 | Kim |
| 2016/0311323 | A1 | 10/2016 | Lee et al. |
| 2017/0193982 | A1 | 7/2017 | Agrawal et al. |
| 2017/0212583 | A1 | 7/2017 | Krasadakis |
| 2017/0223413 | A1 | 8/2017 | Kozloski et al. |
| 2017/0315612 | A1 | 11/2017 | Shanware |
| 2018/0070113 | A1 | 3/2018 | Phillips et al. |
| 2019/0261027 | A1 | 8/2019 | Edward |
| 2019/0362557 | A1 | 11/2019 | Lacey et al. |
| 2021/0329381 | A1 | 10/2021 | Holman et al. |
| 2022/0095074 | A1 | 3/2022 | Reddy |
| 2022/0103873 | A1 | 3/2022 | Yoshida et al. |
| 2022/0104910 | A1 | 4/2022 | Shelton et al. |
| 2022/0337697 | A1 | 10/2022 | Huang et al. |
| 2022/0337780 | A1 | 10/2022 | Huang |
| 2023/0130770 | A1* | 4/2023 | Miller .................... G06N 20/00 345/156 |
| 2023/0275892 | A1 | 8/2023 | Pati et al. |
| 2023/0386469 | A1 | 11/2023 | Horton et al. |
| 2024/0094977 | A1 | 3/2024 | Phillips |
| 2024/0163523 | A1 | 5/2024 | Foerster et al. |
| 2025/0280174 | A1 | 9/2025 | Wannerberg |

OTHER PUBLICATIONS

Microsoft Build, “Gaze—MRTK2” (Aug. 4, 2022),(https://learn. microsoft. com/en-us/windows/mixed-reality/mrtk-unity/mrtk2/features/input/gaze?view=mrtkunity-2022-05), (2 pages).

Petter Wannerberg, “Gaze-Based Audio Switching and 3D Sight Line Triangulation Map”, (U.S. Appl. No. 18/592,213, filed Feb. 29, 2024).

U.S. Appl. No. 18/592,213, filed Feb. 29, 2024, Petter Wannerberg.

* cited by examiner

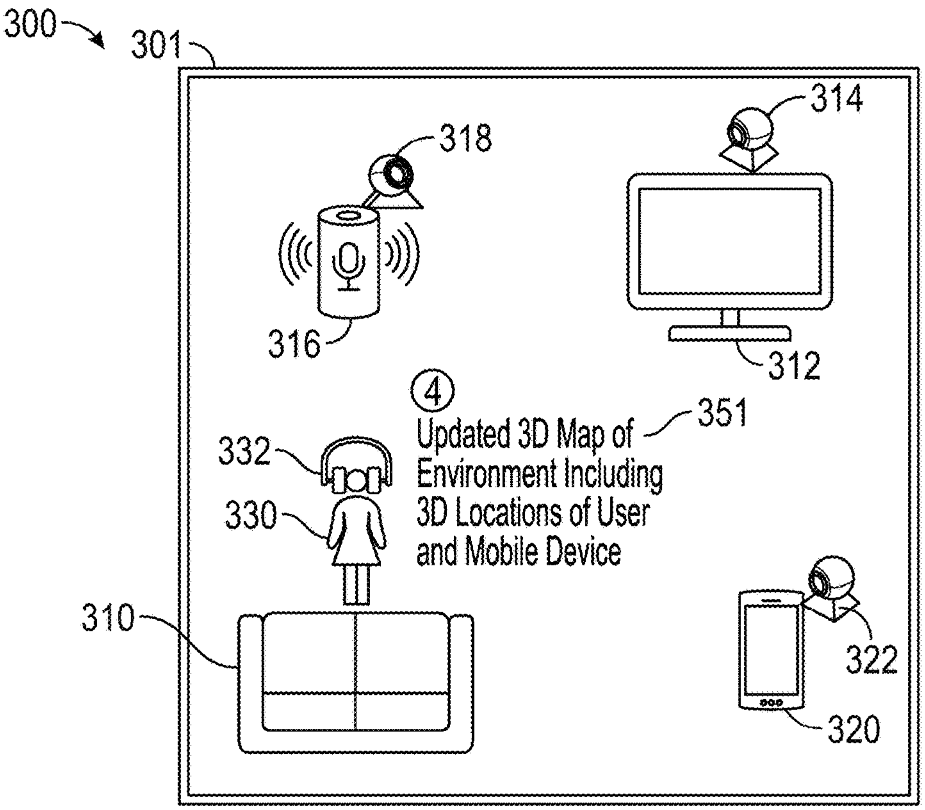

FIG. 3C 300
301
5
Home Assitant with Camera Collects Video Data on Eye Movement/ Head Position of User
318
314
6
SmartTV with Camera Collects Video Data on Eye Movement/Head Position of User
316
312
7
Mobile Device With Camera Collects Video Data on Eye Movement/Head of User
332
330
340
310
8
Plurality of Video Data is Cross-Referenced with Updated 3D Map to Determine Gaze of User is Directed to Display of Mobile Device
322
320

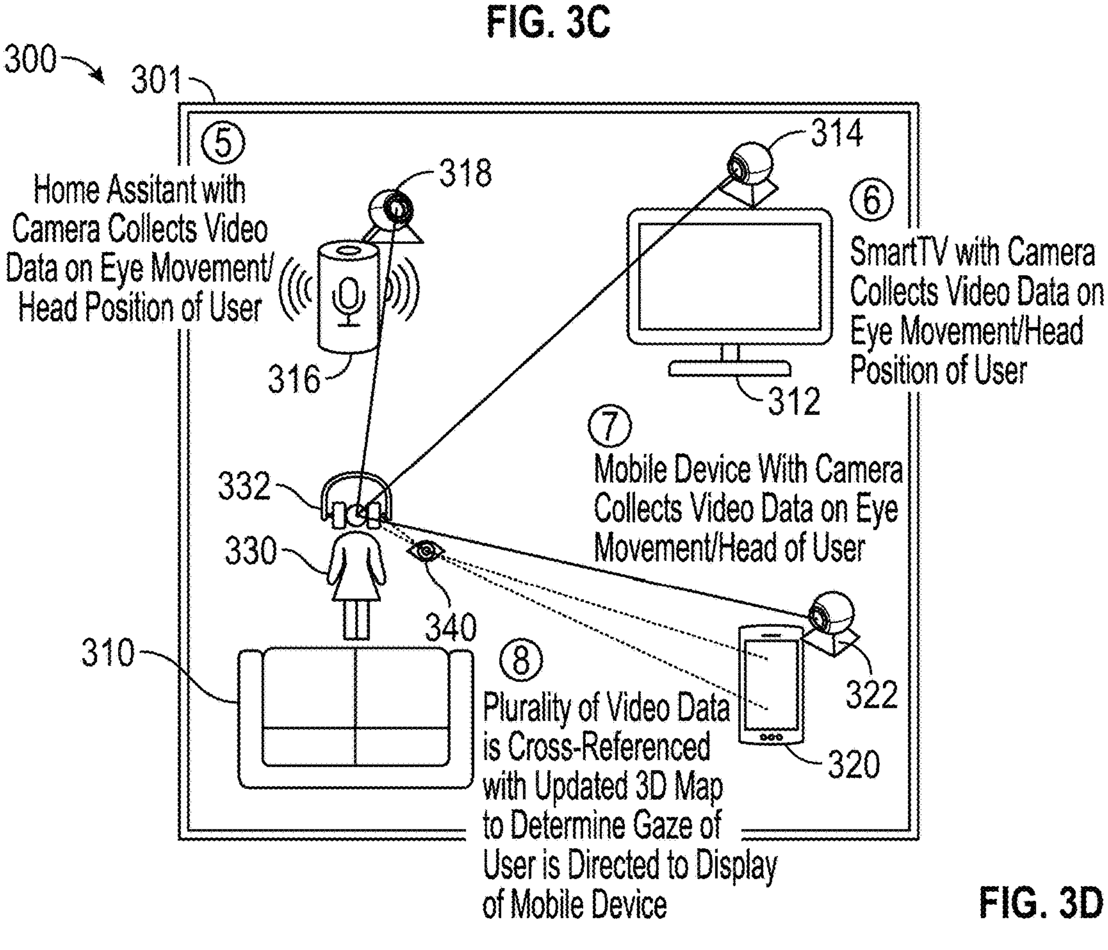

FIG. 3D

GAZE-BASED AUDIO SWITCHING AND 3D SIGHT LINE TRIANGULATION MAP

BACKGROUND

This disclosure relates to providing multiple media streams to multiple devices and gaze detection.

SUMMARY

Modern media delivery systems commonly provide multiple media streams to multiple devices in the same environment. For example, such multi-delivery may occur because multiple user devices (e.g., operated by different users) have requested multiple media streams for consumption. In such an environment, the system can, for example, output audio of at least some media via headphones while video is being provided to respective displays of personal devices, e.g., to mitigate sound interference that would otherwise result from multiple devices simultaneously playing audio via speakers. Sometimes, in such a scenario, a first user wants to peek into a device of another user. As a result, the first user could see the video on the screen of the second user's device but not receive the accompanying audio which is being output to headphones connected to the second user's device. The system can output the accompanying audio via a speaker such that the first user can hear it, but this results in sound interference with audio of other media that is already playing on other personal devices in the environment.

In one approach, while the audio/video stream is sent to the second user's device, a copy of the audio/video stream is also sent to the first user. For instance, the copy may be transmitted by way of sending a hyperlink or audio/video file to the first user's device. However, creating and transmitting duplicate copies of the same content stream results in wasted resources, including consuming bandwidth. A server may expend resources to replicate the audio/video file, which may be large in size. The server would then need to combine, mix, and encode the same audio/video file multiple times. Transmission of these duplicated streams over the wireless network to multiple computing devices consumes bandwidth on the network, which can also compromise resolution of each stream. Sending the copies to multiple computing devices consumes storage in each of those devices and requires each device to decode the stream, thereby consuming bandwidth and processing power of each device.

In one approach, the first user can borrow the second user's headphones or temporarily connect the first user's own headphones with the second user's smartphone. However, switching and connecting back and forth between devices is cumbersome, delays playback of the media, and may also require the second user to manually pause the video before and after switching devices and to manually synchronize playback when the devices are temporarily switched. Constantly switching and connecting between devices can also increase the risk of errors with toggling between the multiple headphones to the same smartphone (e.g., audio output to one user's headphones fails, or the audio output is directed to the wrong headphones) and retransmission errors, which can cause the multiple connected headphones to underperform. Moreover, it deprives the second user the ability to hear the audio when both users are watching the video together on the second user's smartphone screen.

To solve these problems, systems and methods described are provided herein for modifying delivery of audio portions of media streams based on detected user gaze. In some approaches, a media application is provided for modifying the delivery of the audio portions. The media application may be executed at least in part at one or more remote or local servers (e.g., a content provider server which combines, encodes, and distributes the audio portions, or a cloud application), computing devices (e.g., mobile devices or headphones which receive the media streams and/or audio portion of the media streams), a central audio media source device connected to the same Wi-Fi network as the computing devices (e.g., a smart TV or home theater PC through which all audio media flows and which distributes audio to the computing devices), and/or at or distributed across any one or more other suitable computing devices, in communication over any suitable type of network (e.g., the Internet, local wireless network, cloud-based service).

In some embodiments, the media application determines that a first audio/video stream is provided to a first device of a first user and that a second audio/video stream is provided to a second device of a second user. In some approaches, the media application determines that the gaze of the second user is directed to the display of the first device. Based on this determination, the media application pauses the second audio/video stream at the second device and causes an audio portion of the first audio/video stream to be played by the second device.

In some embodiments, the first device and second device may be connected to the same wireless network. In some embodiments, the media application pauses the second audio/video stream at the second device by: identifying the second audio/video stream provided to the second device via the wireless network based on the metadata of the stream, and temporarily preventing delivery of the stream to the second device via the wireless network.

In some embodiments, the media application causes the audio portion of the first audio/video stream to be played by the second device by: receiving the first audio/video stream over the wireless network; identifying the stream being provided to the first device via the wireless network based on the metadata of the stream; decoding the audio portion of the stream; combining and encoding the audio portion of the stream; and distributing, over the wireless network, the audio portion of the stream to the second device.

In some embodiments, when the media application (e.g., by way of a camera) no longer detects the gaze of the second user on the first device, the media application terminates the audio portion of the first audio/video stream to the second device over the wireless network. The media application then resumes delivery of the second audio/video stream to the second device over the wireless network.

In some embodiments, the media application determines the gaze of the second user by maintaining a 3D map of the environment. The 3D map may indicate respective 3D locations of multiple camera devices in the environment. The media application may analyze first video data from the multiple camera devices to identify a 3D location of the second user in the environment and a 3D location of the first device in the environment. The media application updates the 3D map of the environment indicating the 3D location of the second user and the 3D location of the first device. The media application may analyze second video data from the multiple deices in combination with cross-referencing the updated 3D map to determine that the gaze of the second user is directed at the first device.

A benefit of the described systems and methods includes saved resources and lowered costs by avoiding replication of the video stream and distribution of multiple copies across a network to multiple computing devices. By modifying delivery of audio portions of the media streams, a server would not need to expend resources to duplicate the video stream or combine, mix, and encode such copies. Avoiding replication of the video stream eliminates transmission of duplicate video streams which results in less data being distributed across the wireless network, thereby freeing up bandwidth on the network. The saved bandwidth also allows the server to provide a single video stream in higher resolution. Eliminating transmission of duplicate video streams to multiple computing devices saves storage on the computing devices, and further removes the need for the computing devices to expend bandwidth and processing power to decode the video streams.

Gaze detection systems are commonly used to identify the object of the user's gaze, such as to determine that the user is looking at a display of a computing device. Such gaze detection systems may employ, for example, eye tracking techniques to determine the gaze of the user. However, accuracy in gaze detection systems can be compromised due to various factors. For example, the accuracy of gaze estimation decreases when the focal point of the user's gaze is out of range of a gaze tracking device (e.g., the user's eyes are looking away from, or beyond a certain distance of the camera of a tracking device). When the user's gaze is out of range of the gaze tracking device, the gaze tracking device can lose track of the user's eye movements and is unable to determine where the user's gaze is landing. Gaze detection accuracy can also be compromised when the position of the target of the user's gaze is dynamic and/or when the position of the device capturing the user's eye movement data is itself dynamic. For instance, it is difficult determine where the user's gaze is landing when the user is looking at a moving target or if the gaze tracking device itself is moving. Moreover, it is important to get accurate location data of the user and the target of the gaze in order to triangulate the user's gaze.

In one approach, multiple cameras can be installed in every room and from numerous positions in an environment to track the user's gaze when the user is in various locations. However, installing numerous camera equipment and their maintenance is expensive. The excessive video streams consume storage on the server and/or computing devices. Each computing device must also expend processing power to decode, analyze, and select which video stream includes relevant data for tracking the user's gaze.

In one approach, every tracking device may be configured with a multitude of sensors, such as inertial sensors, optical sensors, lidar, sonar, or positioning systems, for collecting accurate location data of the user and the tracking device for triangulating the user's gaze. However, installation of extra sensor equipment is costly. Moreover, more processing power is needed to support the multiple tracking devices to perform positioning calculations, such as Simultaneous Localization and Mapping (SLAM) calculations.

To solve these problems, systems and methods are provided herein for modifying a 3D map of an environment with user gaze data. In some approaches, a gaze mapping application is provided for modifying the 3D map of the environment with user gaze data. The gaze mapping application may be executed at least in part at one or more remote or local servers, computing devices or camera devices (e.g., an eye tracking device or a mobile or smart device connected to a camera), and/or at or distributed across any one or more other suitable computing devices, in communication over any suitable type of network (e.g., the Internet or local wireless network). In some embodiments, the media application comprises the gaze mapping application. In some embodiments, the gaze mapping application is executed together with the media application (e.g., at a central audio media source device connected to the same Wi-Fi network as the computing devices, such as a smart TV or home theater PC).

In some embodiments, the 3D map indicates 3D locations of a plurality of camera devices in the environment. Each camera device can capture video data of the environment. The gaze mapping application can analyze first video data captured from the camera devices to identify (a) a 3D location of the user in the environment and (b) a 3D location of a mobile device in the environment. The gaze mapping application may update the 3D map to include the 3D locations of the user and of the mobile device. The gaze mapping application may analyze second video data captured from the camera devices in combination with cross-referencing the updated 3D map, to determine that the user's gaze is directed to a display of the mobile device. Based on determining the gaze, the gaze mapping application may cause the mobile device to perform an action. In some embodiments, such action can include playing media content, sharing media content, causing a second device to play media content which is already playing on the mobile device, playing media content on the mobile device which is already playing on the second device, or activating a household appliance.

In some embodiments, the mobile device is capable of capturing video data of the environment. In some embodiments, the gaze mapping application analyzes the second video data in combination with cross-referencing the updated 3D map by: receiving, from each camera device and the mobile device, eye movement data and/or head position data of the user; projecting a line of sight of the user based on cross-referencing such data from each device and using the updated 3D map; and triangulating the gaze of the user based on the cross-referenced line of sight in the updated 3D map.

In some embodiments, the 3D map of the environment comprises a plurality of reference meshes, wherein at least one of the reference meshes corresponds to the mobile device. The gaze mapping application can determine that the gaze of the user is on the mobile device based on determining a focal point of the triangulated gaze of the user, and determining a collision of the focal point with the reference mesh corresponding to the mobile device.

In some embodiments, the 3D location of the user in the environment may be a blind spot, wherein no camera devices are present. The gaze mapping application can determine a blind spot based on determining a previous 3D location of the user based on a most recent trigger of a collision volume corresponding to a particular 3D location of a reference mesh in the environment and a second 3D location which the user is not located in based on non-triggering of a second collision volume corresponding to the second 3D location. The gaze mapping application may estimate a trajectory of the user based on a first duration that the user was at the previous 3D location and a second duration that the user was not located in the second 3D location. The gaze mapping application may triangulate the gaze of the user located in the blind spot based on: calculating a geometry of the blind spot with respect to the 3D map of the environment; projecting a line of sight from the user in the blind spot based on the calculated geometry of the blind spot and the estimated trajectory of the user; and determining a collision between the projected line of sight with a reference mesh corresponding to the mobile device.

A benefit of the described systems and methods includes eliminating the need to install additional eye tracking equipment by utilizing existing camera devices already in the environment for collecting accurate user location data and device location data. This results in conserving energy otherwise needed to operate such equipment. This also conserves network resources, such as storage and bandwidth, otherwise needed to store, process, and transfer data (e.g., video streams) from each equipment and to analyze which data from the multitude of camera devices includes relevant data for gaze calculation.

Another benefit includes eliminating the need to reposition tracking devices to capture a user's dynamic gaze (e.g., where the user changes position or the gaze target changes position) by cross-referencing position data of the user and of the gaze target captured by multiple existing devices in the environment. This allows for real-time detection of a user's dynamic gaze, thereby avoiding gaze calculation delays due to continuously reconfiguring the tracking devices each time they are repositioned. This also increases accuracy of the gaze calculation when the user's position and/or the position of the gaze target is dynamic.

Yet another benefit includes accurately triangulating the user's gaze when the user in a blind spot by cross-referencing user position data and gaze target position data between existing camera devices in a nearby environment. This also eliminates the need to install additional tracking equipment or reposition and reconfiguring them, thereby conserving energy for operating and processing data of such additional equipment and reducing delays in real-time dynamic gaze calculations.

BRIEF DESCRIPTION OF THE FIGURES

The present disclosure, in accordance with one or more various embodiments, is described in detail with reference to the following Figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 2 shows an example system of providing an immersive virtual experience in autonomous vehicles in self-driving mode, in accordance with various embodiments of this disclosure;

FIGS. 3A-3E show an example scenario of maintaining and modifying a 3D map of an environment for triangulating a gaze of a user, in accordance with various embodiments of the disclosure;

DETAILED DESCRIPTION

Figure 1A:
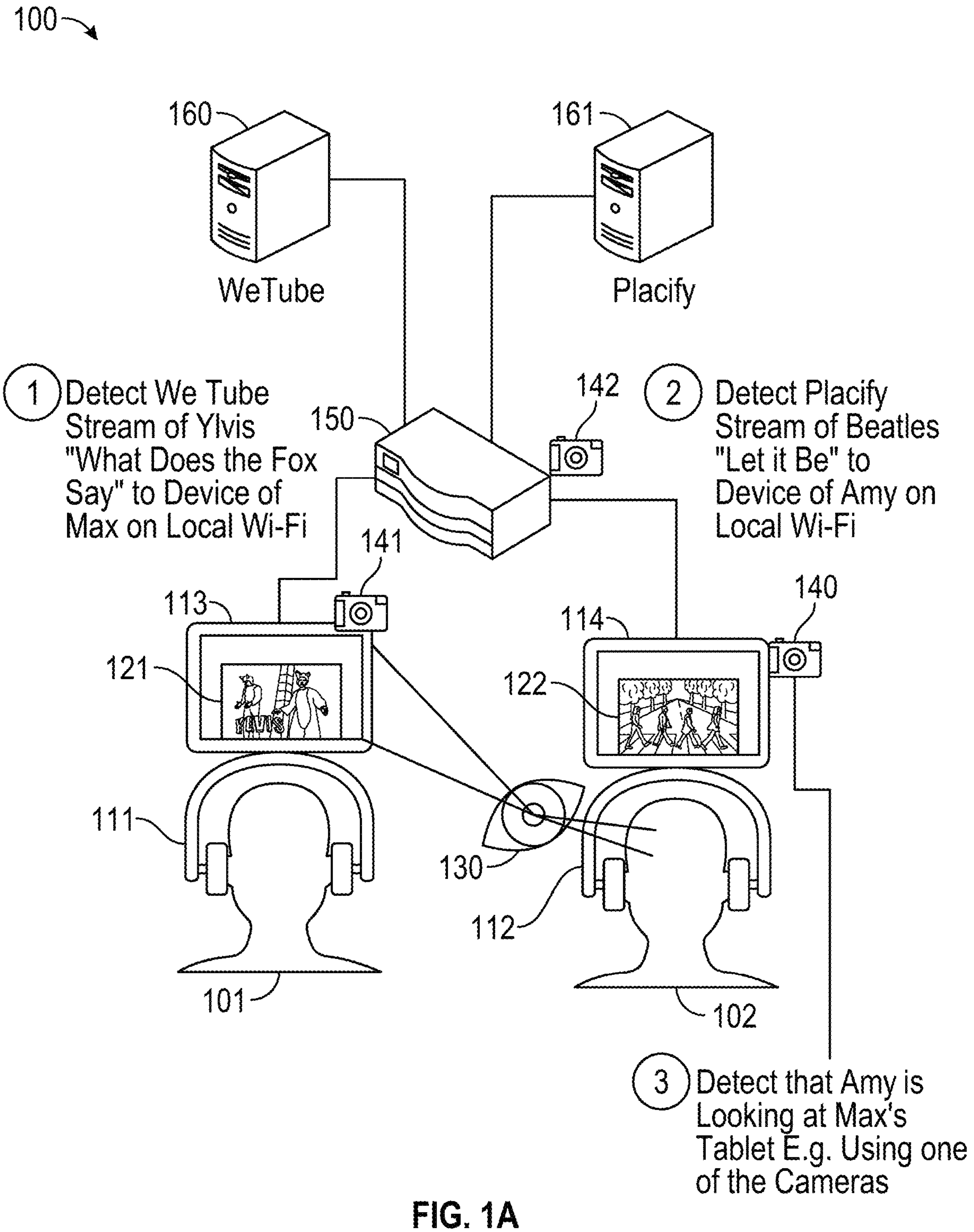
FIGS. 1A and 1B show an example scenario of a using a system for gaze-based audio switching, in accordance with various embodiments of this disclosure.
Figure 1B:
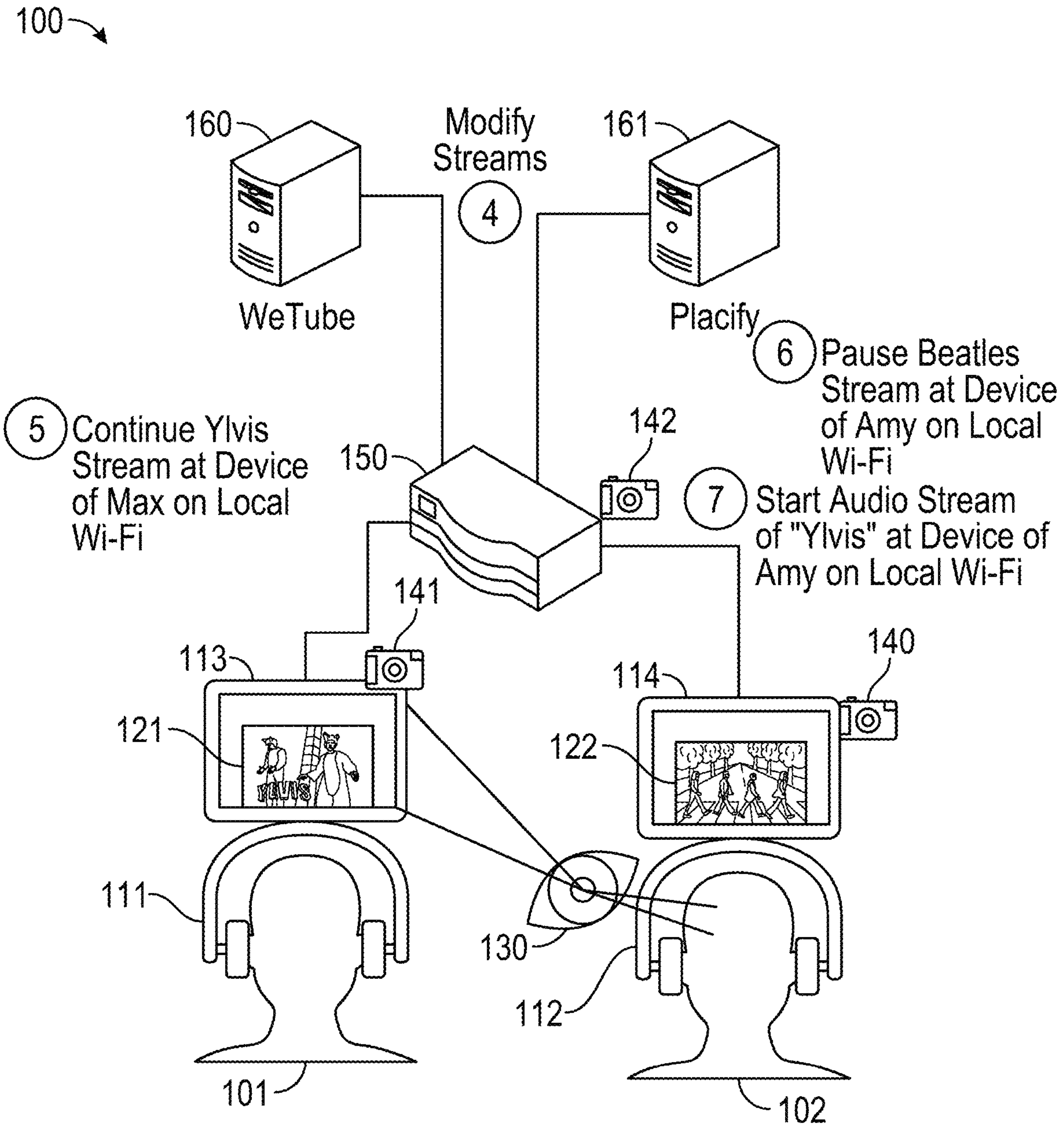

FIGS. 1A and 1B show an example scenario 100 of a using a system for gaze-based audio switching, in accordance with various embodiments of this disclosure. In some embodiments, a media content server provides content streams (also referred to as media streams) to various client devices that are in the same environment. In some alternative embodiments, each of a plurality of media content servers provides content streams to the various client devices that are within the same environment. For example, client devices, such as user devices 113, 114, may each include any one of smartphones, tablets, laptops or notebooks, smart televisions, gaming consoles, smart speakers, wearable devices, digital cameras, extended reality (XR) devices (e.g., virtual reality (VR) headsets or augmented reality (AR) glasses), or other computing devices suitable for consuming media content. In some embodiments, the first user device 113 and second user device 114 are located within the same environment when they are in the same physical space. For example, the positions of each user device 113, 114 may be within a particular distance of each other. For example, users 101 and 102 and their respective devices are within a common boundary of an environment, such as sitting together in the living room or riding in the same vehicle. In some embodiments, the various client devices within an environment are connected to the same network. For instance, user devices 113 and 114 may be connected to the same local Wi-Fi network (e.g., by way of networking device 150) or other suitable local area network (e.g., LAN).

In some embodiments, content server 160 (e.g., "WeTube") provides a first media stream 121 (e.g., an audio/video (AV) stream of "What Does the Fox Say," by Ylvis) by way of networking device 150 to the first user device 113 associated with a first user 101 (e.g., Max's tablet). Meanwhile, content server 161 (e.g., "Placify") provides a second media stream 122 (e.g., an AV stream of "Let It Be," by the Beatles) by way of networking device 150 to second user device 114 associated with a second user 102 (e.g., Amy's tablet). As referred to herein, the terms "media," "media asset," and "content" may be understood to mean electronically consumable user assets, such as audio/visual content, television programming, as well as pay-per-view programs, on-demand programs (as in video-on-demand (VOD) systems), live content, Internet content (e.g., streaming content, downloadable content, Webcasts, etc.), video clips, audio, content information, pictures, GIFs, rotating images, documents, playlists, websites, articles, books, electronic books, blogs, advertisements, chat sessions, social media, applications, games, XR content, 3D content and/or any other media or multimedia and/or combination of the same. As referred to herein, the term "multimedia" should be understood to mean content that utilizes at least two different content forms described above, for example, text, audio, images, video, or interactivity content forms. Content may be recorded, played, transmitted to, processed, displayed and/or accessed by a computing device, and/or can be part of a live performance or live event. In some embodiments, the media asset is generated for display from a broadcast or stream received at a computing device, or from a recording stored in a memory of the computing device and/or a remote server.

In some embodiments, the first user device 113 is communicatively connected to a first audio device 111 associated with the first user 101, and the first user device 113 routes the audio portion of the first media stream 121 to the first audio device 111. For instance, Max (e.g. first user 101) may watch the video stream of "What Does the Fox Say" on his tablet (e.g., first user device 121) while listening to the audio portion of the video stream bu way of his headphones (e.g., first audio device 111). In addition to, or alternatively, in some embodiments, the second user device 114 is communicatively connected to a second audio device 112 of the second user 102, and the second user device 122 routes the audio portion of the second media stream 122 to the second audio device 112. For instance, Amy (e.g., second user 102) watches the video stream of "Let It Be" on her tablet (e.g., second user device 114) while listening to the audio portion of the video by way of her headphones (e.g., second audio device 112).

In some approaches, a media application is provided for modifying delivery of the audio portions of the media streams to the user devices and/or associated devices. In some embodiments, the media application is executed at least in part at one or more remote or local servers (e.g., a content provider server which combines, encodes, and distributes the audio portions, such as media content source 802 or server 804 of FIG. 8), and/or at database 805 of FIG. 8, and/or computing devices (e.g., mobile devices or headphones which receive the media streams and/or audio portion of the media streams, such as user devices 113, 114, audio devices 111, 112, or computing device 700, 701 of FIG. 7, or user equipment 807, 808, 810 of FIG. 8), and/or a central audio media source device connected to the same Wi-Fi network as the computing devices (e.g., a smart TV or home theater PC through which all audio media flows and which distributes audio to the computing devices, such as smart TV 222 of FIG. 2), and/or at or distributed across any one or more other suitable computing devices, in communication over any suitable type of network (e.g., the Internet or local wireless network such as a LAN associated with networking device 150 or communication network 809 of FIG. 8). For instance, networking device 150 may comprise a router, modem-router or gateway, wireless access point, or any other suitable network device.

In some embodiments, at step 1 of FIG. 1A, the media application detects that the first media stream 121 (e.g., video of "What Does the Fox Say," by Ylvis) is being provided on the local wireless network (e.g., by way of networking device 150) to the first user device 113 (e.g., Max's tablet). At step 2 of FIG. 1A, the media application also detects that the second media stream 122 (e.g., video of "Let it Be," by The Beatles) is being provided on the same local wireless network (e.g., by way of networking device 150) to the second user device 114 (e.g., Amy's tablet). The media application determines the source and destination of each media stream 121, 122 based on metadata associated with the respective media streams. Additionally, or alternatively, the media application determines the source and destination of each media stream 121, 122 by communicating directly with each content server 160, 161. Additionally, or alternatively, the media application identifies or monitors the media streams 121, 122 received or playing at each user device 113, 114, respectively.

In some embodiments, the media application monitors the gaze of each user and identifies the target object, such as computing device (or a target portion thereof) of each respective gaze at a given time. At step 3 of FIG. 1A, the media application identifies the second user 102 and determines that the gaze 130 of the second user 102 is directed at the display of the first user device 113. For example, Amy (e.g., second user 102) may be watching "Let It Be" (e.g., the second media stream 122) on the display of her tablet (e.g., second user device 114), and then shift her gaze 130 to peek at the display of Max's tablet (e.g., first user device 113) and temporarily watch "What Does the Fox Say?" (e.g., the first media stream 121). The media application may identify the second user 102 and her associated devices 114, 112, based on, for instance, user profile data, metadata associated with media stream 122, face recognition (discussed in further detail in FIGS. 10 and 11), or using a modified 3D map of the environment based on cross-referenced video data of the user from a plurality of camera devices (discussed in further detail in FIGS. 3A-3E). The media application determines gaze 130 of the identified second user 102 based on eye tracking data of the second user 102, received by way of various camera devices in the environment. Such various camera devices may include, for instance, user devices 113, 114 and networking device 150 which are communicatively connected with and/or integrated with cameras 141, 140, 142, respectively, and/or other suitable devices with image or video capturing capabilities. Capturing eye tracking data may include measuring and recording the movements and positions of the eyes of the user. Eye tracking data may comprise the direction, velocity, and duration of eye movements, as well as the position of the pupil and the corneal reflection. Cameras 140, 141, 142 may also include specialized sensors which track the eye movements of users. Camera devices 140, 141, 142 may also be integrated with IR (infrared) illuminators, which allow the camera devices 140, 141, 142 to capture eye tracking data of a user under any lighting condition.

In some embodiments, the media application analyzes the eye tracking data (e.g., captured eye movements) to precisely determine the gaze of a user and other information relating to how a user's eyes move (e.g., user's eye movement patterns). Gaze refers to the specific direction or point in space at which a user is looking. The media application estimates gaze 130 of the second user 102 utilizing gaze estimation algorithms and/or eye tracking machine learning models to interpret the eye tracking data and calculate the estimated gaze vector and/or estimated gaze point. The gaze vector is also referred to as the line of sight or sight line of the user. The gaze point comprises a 3D point in space indicated by the gaze vector (e.g., terminal point of the gaze vector).

Additionally, or alternatively, in some embodiments, the media application determines gaze 130 based on glint tracking data. For example, camera devices 140, 141, 142 may track, in addition to the iris and/or the whites of the eye, the lighting glints on the eyeball from the ambient light in the environment. The media application cross-references glint tracking data with eye movement data to increase the accuracy of gaze estimation, such as when many parts of the user's eyes are obscured, if the user's eyes are turned away from or are far away from (e.g., beyond a particular distance of) the view of the camera device, or if the eyes are not illuminated by IR.

Additionally, or alternatively, in some embodiments, the media application determines gaze 130 based on head gaze data. Head gaze data includes head position in relation to the camera. Additionally, or alternatively, in some approaches, media application estimates the user's gaze by combining head gaze data and eye tracking data. The media application further uses the combined head gaze and eye tracking data to determine the possible gaze point candidates that can be eliminated. For example, a user's head may be directed toward one direction while the user's eyes are focused in another direction or focused on a different target object than head gaze data would otherwise indicate on its own. The media application further uses the head gaze data to distinguish between possible target objects of the user's gaze. For example, multipole objects may be possible target objects of the user's gaze because they are close to each other within a degree of angle that is below a certain value.

Additionally, or alternatively, the media application determines the gaze of each user using a modified 3D gaze map of the environment indicating the gaze of each user in real-time, discussed in further detail in FIGS. 3A-3E.

In some approaches, at step 4 of FIG. 1B, the media application modifies delivery of the audio portions associated with the media streams 121, 122 such that the audio portion transmitted to the device(s) associated with each user matches the visual content displayed on the target object of the user's gaze. The media application determines which audio portion to deliver to which device based on determining the current gaze of each user and identifying the respective device(s) associated with each user. Additionally, or alternatively, the media application determines which audio portion to deliver to which device based on the respective real-time gaze of each user as indicated by way of the modified 3D gaze map of the environment based on cross-referencing positioning data and gaze data from multiple camera devices (discussed in further detail in FIGS. 3A-3E). For example, when the media application detects that the second user 102 peeks at the first user device 113 to watch the first media stream 121, media application may identify the content playing at the device of the second user's 102 gaze 130 (e.g., the first media stream 121). The media application may modify delivery of the audio and/or video streams such that the second user 102 can also hear the accompanying audio of the first media stream 121 on her audio device 112. For example, when media application detects that the second user 102 returns her gaze to her own second device 114 to resume watching the second media stream 122, media application may identify the content playing at the device of the second user's 102 current or updated gaze (e.g., the second media stream 122). The media application may redistribute audio and/or streams such that the second user 102 can hear the accompanying audio of the second media stream 122.

In some embodiments, at step 5 of FIG. 1B, the media application determines that the first user 101 continues to direct his gaze at his own first user device 113. The media application identifies that the current content playing on the first user device 113 is media stream 121 (e.g., "What Does the Fox Say?") based on various data, such as metadata associated with the media stream 121 and/or by monitoring activity of first user device 113. Based on these determinations, media application (or content server 160) continues to facilitate delivery of the first media stream 121 (e.g., "What Does the Fox Say?") to the first user device 113 of first user 102 over the wireless network. The media application also continues delivering accompanying audio (e.g., music associated with "What Does the Fox Say?") to the first audio device 111.

In some approaches, at step 6 of FIG. 1B, the media application pauses delivery of the second media stream 122 (e.g., "Let It Be" video) at the second user device 114. Additionally, the media application pauses delivery of the audio portion of the second media stream 122 (e.g., music associated with "Let It Be") at the second audio device 112. In some alternative approaches, the media application continues to deliver the second media stream 122 at the second user device 114 but dampens (e.g., lowers or mutes) the volume of the audio component of the second media stream 122 at the second audio device 112.

In some embodiments, at step 7 of FIG. 1B, the media application delivers the audio portion of the first media stream 121 (e.g., music associated with "What Does the Fox Say?") to the second audio device 112. In some alternative embodiments, the media application sends a request to the content server 160 for a replicate of the audio portion of the first media stream 121. Media application then distributes one copy of the audio portion of the first media stream 121 to the first user 101 at the first audio device 111 and another copy of the audio portion of the first media stream 121 but distributes a single video stream of the first media stream to the first user device 113.

In some embodiments, the media application determines that the gaze of the first user 101 is not directed to a display of any device. Based on the determining, the media application continues delivery of the audio portion of the first media stream 121 to the first user device 113 over the wireless network. For example, the first user 101 may temporarily angle the first user device 113 toward the second user 102, such that the second user 102 can peek at the first media stream 121 and momentarily watch "What Does the Fox Say?" The media application may continue to route the audio portion of "What Does the Fox Say?" to the first user 101 at the first audio device 111 while simultaneously delivering a copy of that audio portion to the second user 102 at the second audio device 112, despite the first user 101 not currently gazing at the display of his own first user device 113. In some embodiments, the media application synchronizes the distribution of the audio portion of the first media stream 121 to each user device 113, 114. This allows both users 101, 102 to watch and listen to the same content at the same time with each other.

In some approaches, the media application detects that the gaze 130 of the second user 102 is no longer directed to the first user device 113 and/or the gaze 130 is redirected to the second user device 114. Based on the detection, the media application terminates delivery of the audio portion of the first media stream 121 at the second audio device 112. The media application resumes delivering the second media stream 122 to the second user device 114 and resumes delivering the audio portion of the second media stream 122 to the second audio device 112 over the wireless network.

Figure 2:
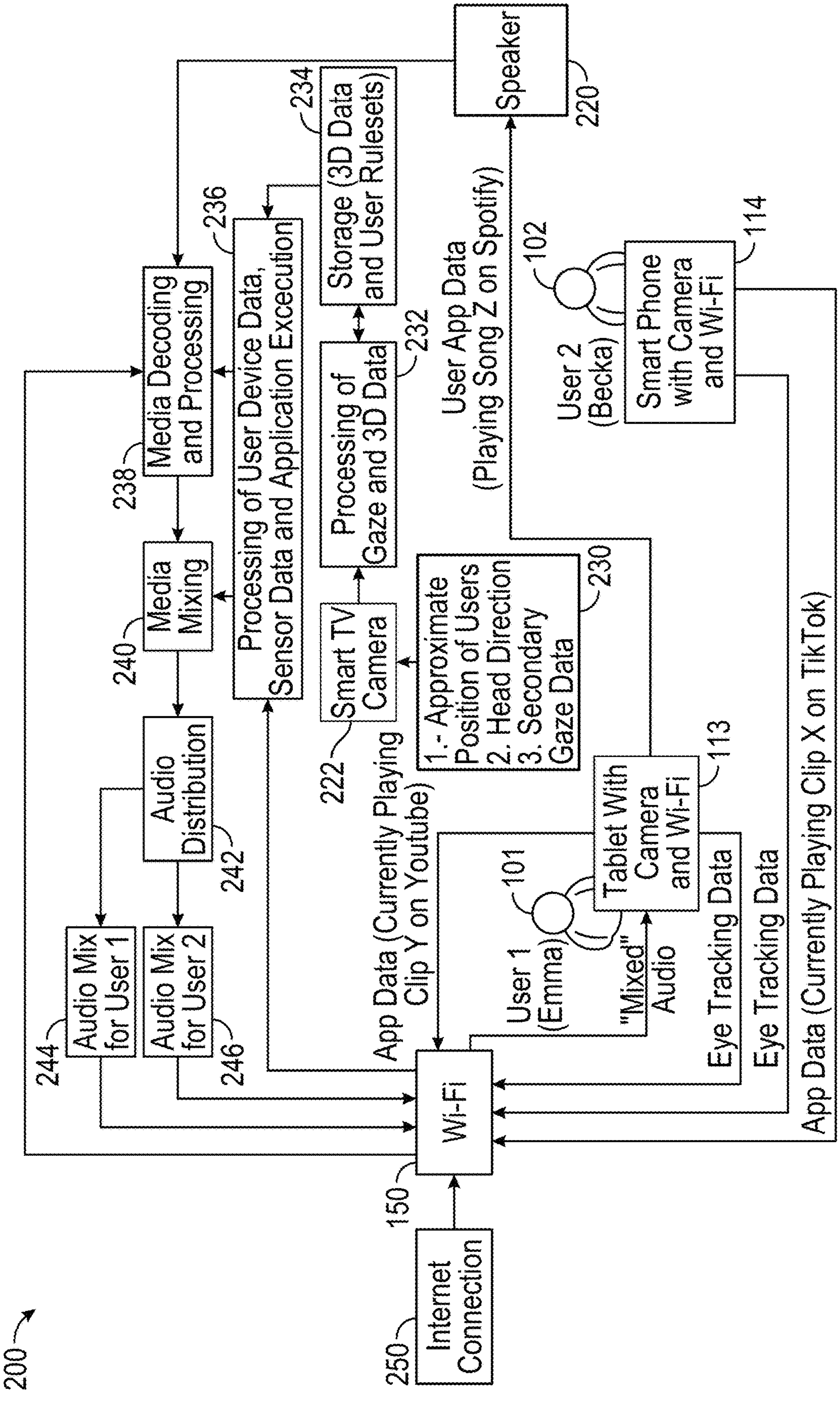
FIG. 2 shows an example network architecture for providing a system for gaze-based audio switching, in accordance with various embodiments of this disclosure.

FIG. 2 shows an example network architecture for providing a system for gaze-based audio switching, in accordance with various embodiments of this disclosure. In some embodiments, user devices 113, 114 are connected to the same local wireless network by way of networking device 150. Additionally, or alternatively, in some embodiments, user devices 113, 114 are connected with a common cloud application, such as the media application by way of a common cloud service. Additionally, or alternatively, in some embodiments, user devices 113, 114 are connected with a common multimedia device such as smart TV 222, on which the media application is executed.

In some embodiments, the media application, for example, by way of smart TV 222, facilitates all audio media flows and distributes content streams and associated audio portions between content servers and each user device 113, 114 and common multimedia devices (e.g., smart TV 222 and speaker 220 which is communicatively connected with smart TV 222).

In some implementations, the media application receives content stream information that is played at each user device 113, 114. For example, each user device 113, 114 may provide to media application metadata associated with the content stream currently playing on each user device. For example, each user device 113, 114 may forward the entire stream package or the decoded audio portion thereof to the media application. For example, media application may communicate directly with content servers which are transmitting the streams to the user devices 113, 114 over the local wireless network or collect the stream information when it arrives at the local wireless network.

In some implementations, the media application receives various data 230 from each camera device in the environment to determine the gaze of each user. For example, the various data 230 may comprise at least one of approximate 3D position of each user 101, 102 in the environment, head direction of each user, or gaze data (e.g., eye tracking data, glint data). For example, the media application may receive eye tracking data of each user in the environment from various devices which capture video feed of the users. For example, each user device 113, 114 may be integrated with camera functionality and/or sensors to capture head position and/or eye tracking data of users 101, 102, respectively. For example, smart TV 222 may also be integrated with camera functionality and capture head position and/or eye tracking data of user 101, 102. Additionally, or alternatively, in some implementations, the media application receives face recognition data of each user.

In some implementations, the media application merges the eye tracking data of the plurality of video feeds received from user devices 113, 114, and smart TV 222. For example, the media application may cross-reference the user position data and eye tracking data from the various video feeds to estimate the gaze of each user. For example, the media application may separately estimate the gaze of each user from the user position data and eye tracking data from each of the various video feeds and cross-reference the gaze estimations to project an accurate line of sight (e.g., gaze vector) and/or gaze point of each user 101, 102. Memory 234 stores the estimated gaze data 232. Additionally, memory 234 stores any user rulesets or user profiles (e.g., indicating user preferences) for management of audio portions of content streams based on the respective user's gaze. For example, a ruleset may define that the audio portion delivered to a user should match the video portion of the content stream that is displayed at the gaze point (e.g., target) of the user's gaze.

In some implementations, the media application determines a modified audio distribution 236 based on the gaze data and using user device data to identify and locate the appropriate destinations for the modified audio distribution. A decoder 238 decodes the audio portions of the appropriate streams. A mixer 240 mixes and combines the audio portions of the streams. Media application, by way of an audio distributor 242, modifies the metadata of each of the audio portions streams such that one of the audio portion streams is directed to user device 113 and the other is directed to user device 114. For example, the media application may request a second copy of the audio portion of the first media stream 121 from content server 160, decode, mix, and combine the audio portion copies, and distribute the audio portion (e.g., the audio of "What Does the Fox Say?") to each user 101, 102. For example, the first user device 113 may decode and send the audio portion of the first media stream 121 directly to the media application, and the media application may mix, combine, and deliver the audio portion to the second user device 114.

In some embodiments, the media application modifies the audio delivered to the various devices based on gaze, by adjusting the sound levels of the audio sources. For example, the media application may tag (e.g., with a "music" tag) each audio source (e.g., speaker 220, first audio device 111 associated with first user 101, second audio device 112 associated with second user 102) when it is playing audio. If second user 102, while listening to a first music stream on her headphones (e.g., second audio device 112), directs her gaze toward smart TV 222 (and/or associated speakers 220) which is playing a second music stream, media application may determine based on her gaze and the current content on her headphones that the "music" tag associated with her headphones conflict with the "music" tag of the speakers 220. Based on a user ruleset associated with the user 102, media application may dampen (e.g., lower or mute) the volume of the music playing through the second audio device 112 while increasing the volume of the music playing through speakers 220 for as long as the second user's 102 gaze remains on the smart TV 222 and/or speakers 220. Additionally, media application may display on second user device 114 information associated with the music playing from the speakers 220 for a period of time after the second user 102 returns her gaze to the second user device 114. Example systems and methods that may be implemented to control and modify audio sources in a room are described in greater detail in connection with Phillips, "Field Of Vision Audio Control For Physical Or Mix Of Physical And Extended Reality Media Displays In A Spatially Mapped Space," patent application Ser. No. 17/949,842, filed Sep. 21, 2022, which is hereby incorporated by reference herein in its entirety.

FIGS. 3A-3E show an example scenario 300 of maintaining and modifying a 3D map 350 of an environment (e.g., living room 301) for triangulating a gaze of a user, in accordance with various embodiments of the disclosure. In some approaches, a gaze mapping application is provided for maintaining and modifying the 3D map 350 of the environment with real-time user gaze data. The gaze mapping application may be executed at least in part at one or more remote or local servers (e.g., server 805 of FIG. 8) and/or at database 805 of FIG. 8, and/or computing devices or any suitable camera devices (e.g., an eye tracking device or a mobile or smart device connected to a camera, such as virtual assistant 316 integrated with camera 318, smart TV 312 integrated with camera 314, mobile device 320 integrated with camera 322, user devices 113, 114 of FIG. 1, smart TV 222 of FIG. 2, computing device 700, 701 of FIG. 7, or user equipment 807, 808, 810 of FIG. 8), and/or at or distributed across any one or more other suitable computing devices, in communication over any suitable type of network (e.g., the Internet or local wireless network such as a LAN associated with networking device 150 or communication network 809 of FIG. 8). In some embodiments, the media application comprises the gaze mapping application. In some embodiments, the gaze mapping application is executed together with the media application (e.g., at a central audio media source device connected to the same Wi-Fi network as the computing devices, such as smart TV 312 or a home theater PC).

Figure 3A:
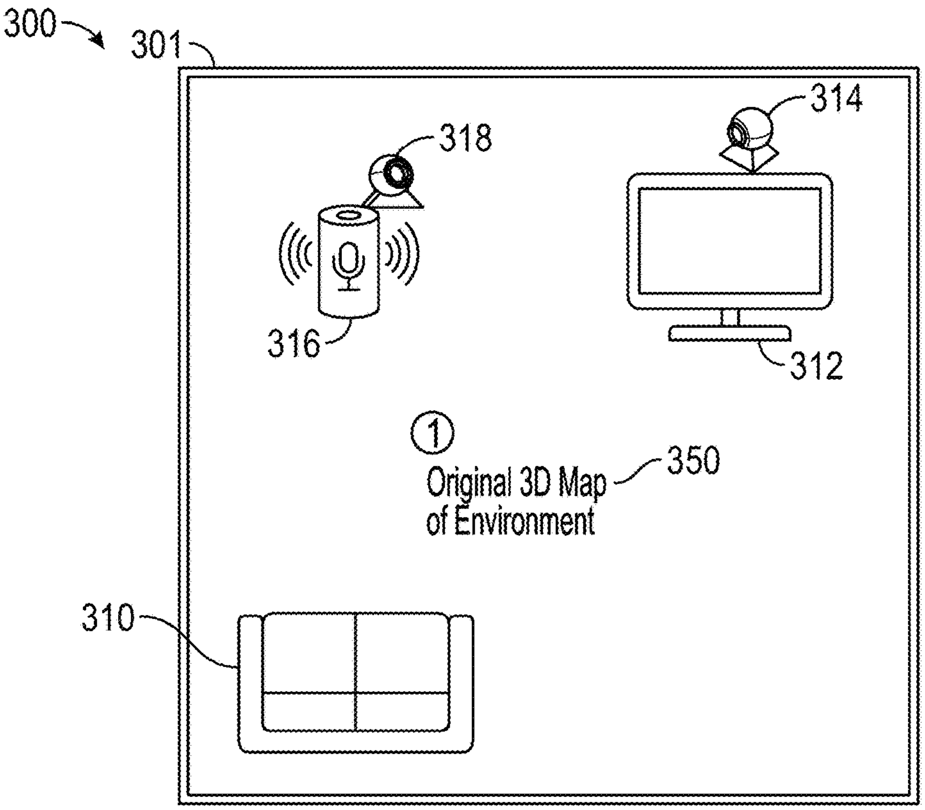
Figure 3B:
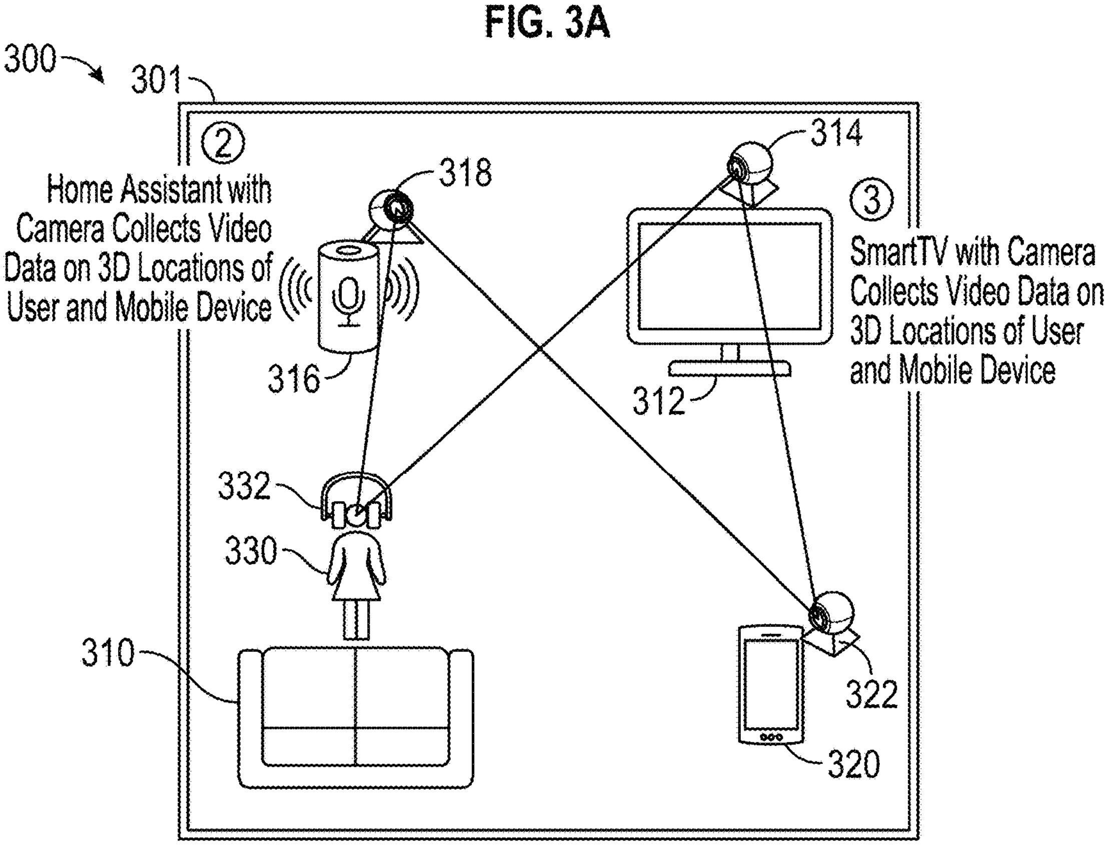
Figure 3E:
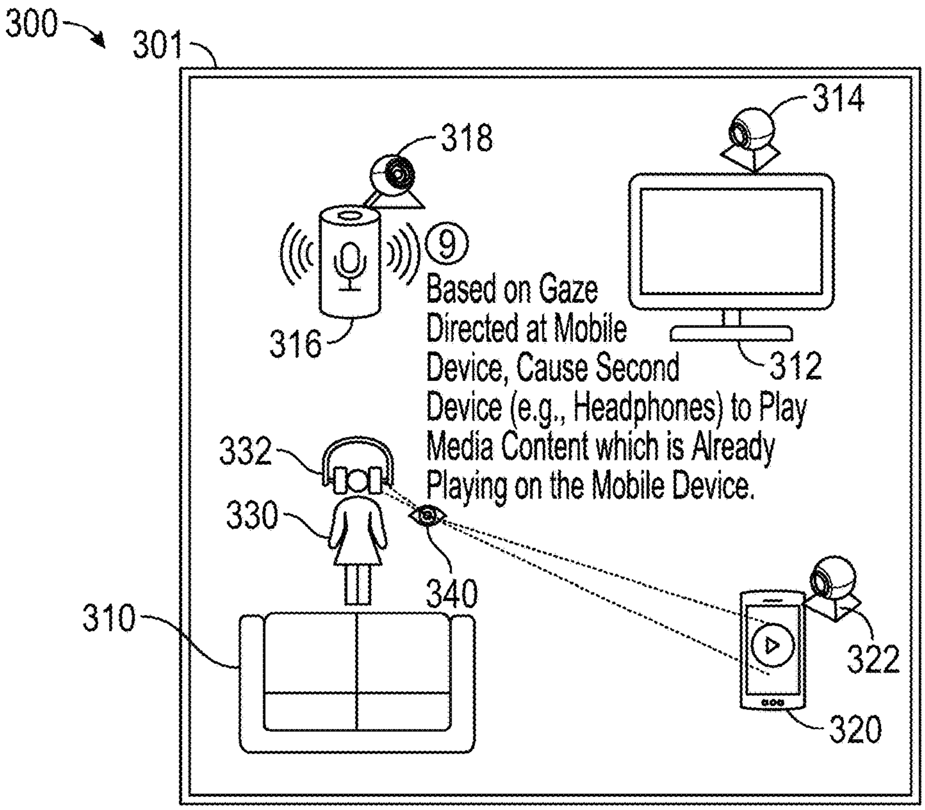

In some embodiments, at step 1 of FIG. 3A, the gaze mapping application maintains an original 3D map 350 of the living room 301. The original 3D map 350 comprises a static 3D map of polygons (also referred to as reference mesh or 3D mesh) representing objects within the environment (e.g., a digital copy of the living room 301) and which indicates the 3D location of such objects. The original 3D map 350 includes digital representations of camera devices (e.g., home assistant 316 integrated with camera 318, smart TV 312 integrated with camera 314) and static points of interest or static objects (e.g., sofa 310). For example, gaze mapping application may generate and provide the original 3D map 350 by way of various techniques, such as using LIDAR enabled devices, creating a CAD (Computer Aided Design) scan of the home, extrapolating 3D images from autonomous devices (e.g., robotic vacuum cleaners, home alarm systems with scanning capabilities). The objects and/or various points of interest (e.g., including 3D points in space) are represented as collision geometries (also referred to as collision volumes or collision boxes). Database 805 of FIG. 8, or other suitable memory or storage, stores and/or records updates to the 3D map 350.

In some embodiments, the gaze mapping application determines the real-time 3D position of dynamic objects and subjects in the living room 301 by cross-referencing position data of such objects and subjects from a plurality of sources (e.g., a first set of video feeds from a plurality of camera devices). For example, the positions of user 330 (e.g., which corresponds to second user 102 of FIGS. 1A and 1B) and mobile device 320 (e.g., which corresponds to first user device 113 of FIGS. 1A and 1B) within the living room 301 change over time. For example, home assistant 316 (e.g., communicatively connected with or integrated with camera 318) and smart TV (e.g., communicatively connected with or integrated with camera 314) may capture video feeds of various objects or subjects in the environment. Cameras 314, 318 may also be equipped with various sensors, such as those with face recognition capabilities, IR illumination, eye tracking, or face and head gaze tracking capabilities, to capture other positional or image data of the objects or subjects. At step 2 of FIG. 3B, home assistant 316 (e.g., by way of camera 318) collects video data on the 3D locations of user 330 and mobile device 320. Additionally, at step 3 of FIG. 3B . . . smart TV 312 (e.g., by way of camera 314) collects video data on the 3D location of user 330 and mobile device 320. The gaze mapping application cross-references the user 330 position data from the video feed captured by home assistant 316 with the user 330 position data from the video feed captured by smart TV 312 to determine an accurate, current 3D position of the user 330. The gaze mapping application also cross-references the mobile device 320 position data from the video feed captured by home assistant 316 with the mobile device 320 position data from the video feed captured by smart TV 312 to determine an accurate, current 3D position of the mobile device 320. By cross-referencing an increasing number of sources of positional data of the same object or subject, gaze mapping application can calculate the real-time 3D position of the object or subject with increased accuracy. Further, sharing and cross-referencing such data results in off-device processing of heavy computational tasks of calculating real-time positions of multiple objects or subjects in an environment.

In some additional embodiments, the gaze mapping application tracks and tags the dynamic objects and subjects by applying computer vision algorithms and using neural network models trained on captured image data from the camera devices.

In some approaches, mobile device 320 also collects position data of itself, which the gaze mapping application cross-references with the position data of the mobile device 320 from the video feeds captured by home assistant 316 and by smart TV 312. For example, mobile device 320 may be equipped with camera capabilities, inertial systems (e.g., which can track gimbal rotation in X, Y, Z coordinates as well as translation movement X, Y, Z by way of accelerometers), LIDAR, or other equipment suitable for capturing self-positioning data.

In some approaches, mobile device 320 also collects position data of user 330 by capturing video feed of the user 330 by way of camera 322. The gaze mapping application then cross-references the position data of the user 330 from three sources (e.g., home assistant 316, smart TV 312, and mobile device 320) to calculate the 3D position of the user with increased accuracy.

In some embodiments, at step 4 of FIG. 3C, the gaze mapping application updates the 3D map 350 (e.g., resulting in updated 3D map 351) to include the calculated 3D positions of user 330 and mobile device 320.

In some embodiments, the gaze mapping application determines the line of sight 340 (also referred to as the gaze or gaze vector) of the user 330 and triangulates the line of sight 340 to identify the target object (e.g., the mobile device 320 located at the gaze point, also referred to as focal point of the gaze) at which the user 330 is looking.

In some example approaches, to determine the line of sight 340, the gaze mapping application projects a line of sight of the user based on cross-referencing gaze data of the user 330 received from a second set of video feeds from multiple sources (e.g., plurality of camera devices). For example, the plurality of camera devices may include home assistant 316 (integrated with camera 318) and smart TV 312 (integrated with camera 314). Additionally, the plurality of camera devices may also include the target object of the gaze itself, such as mobile device (integrated with camera 322). At steps 5-7 of FIG. 3D, the home assistant 316, smart TV 312, and mobile device 320, respectively, collect video data comprising gaze data (e.g., eye tracking data such as eye movement and/or head position) of the user 330. At step 8 of FIG. 3D, the gaze mapping application combines and cross-references the eye tracking data from each camera device with each other to project the user's 330 line of sight. Additionally, in some embodiments, the gaze mapping application projects the line of sight by cross-referencing the combined eye tracking data of the user 330 with the position data cross-referenced from the first set of video feeds captured by the camera device (e.g., position data of the user 330, position data of the target object such as the mobile device 320, and/or position data of the camera devices such as home assistant 316, smart TV 312, and/or mobile device 320), In some example approaches, to triangulate the line of sight 340 (e.g., to identify the target object of the user's 330 gaze), the gaze mapping application cross-references the projected line of sight 340 with the updated 3D map 351. The gaze mapping application maintains a database of locations and sizes for objects and subjects, represented as collision volumes, in the updated 3D map 351. The gaze mapping application determines any collision between the projected line of sight 340 with a collision volume (e.g., corresponding to a reference mesh representation of an object such as mobile device 320) positioned in the updated 3D map 351. When the gaze mapping application detects that the collision volume corresponding to the target object (e.g., mobile device 320) has been triggered, the gaze mapping application identifies the mobile device 320, at its 3D location in the 3D map 351, as the object where the user's 330 line of sight 340 lands. The gaze mapping application updates the 3D map 351 to include the current line of sight 340 and/or gaze point of the user 330 from their current 3D position in the 3D map 351.

In some implementations, gaze mapping application processes the gaze 340 as user input to cause a device to perform an action. For example, the device performing the action may include the target object of the gaze (e.g., mobile device 320), another device associated with the user 330 and/or target object (e.g., headphones 332), or other suitable computing device, appliance, or smart or IoT device. Gaze mapping application identifies the device for performing the action and the action to perform based on various factors, such as inferring user intent based on user profile information or user activity history with the target object, whether the gaze is directed toward a particular portion of the target object (e.g., a graphical icon on the screen of mobile device 320), or a ruleset associated with the target device when the gaze 340 is directed at it. At step 9 of FIG. 3D, based on determining that the gaze 340 of user 330 is directed at the screen of mobile device 320, gaze mapping application causes the headphones 332 (e.g., which corresponds to second audio device 112 of FIGS. 1A and 1B) to play the audio component associated with the content currently playing on mobile device 320. In some additional embodiments, gaze mapping application causes headphones to play such audio component further based on inferring the user's 330 intent based on contextual rules (e.g., an action is assigned to when the user's 330 current circumstances satisfy a particular set of criteria). For example, because user 330 is currently wearing headphones 332 while gazing at content displayed on mobile device 320, gaze mapping application may infer that user 330 intends to hear to the audio component of such content.

Additionally, or alternatively, in some embodiments, gaze mapping application processes other user actions directed at the target object to infer the user's intent for a device to perform an action. For example, gaze mapping application may capture (e.g., by way of sensors and/or cameras 318, 316, 322) the user's 330 gestures, lip reading, or head movements directed toward the mobile device 320. For example, user 330 may gaze at smart TV 312 and point toward a third user who is wearing headphones in the living room 301. Gaze mapping application may determine, based on the combination of the user's 330 gaze directed at the smart TV 312 and the user's 330 gesture directed at the third user, that the user 330 intends for the audio component of content playing on the smart TV 312 to be distributed to the third user's headphones. For example, if user 330 directs her gaze at home assistant 316 for over at least a certain period of time while speaking, the gaze mapping application may determine that the user 330 intends to utter a command or query to the home assistant 316, and may instruct the home assistant to execute such command or query.

Figure 4:
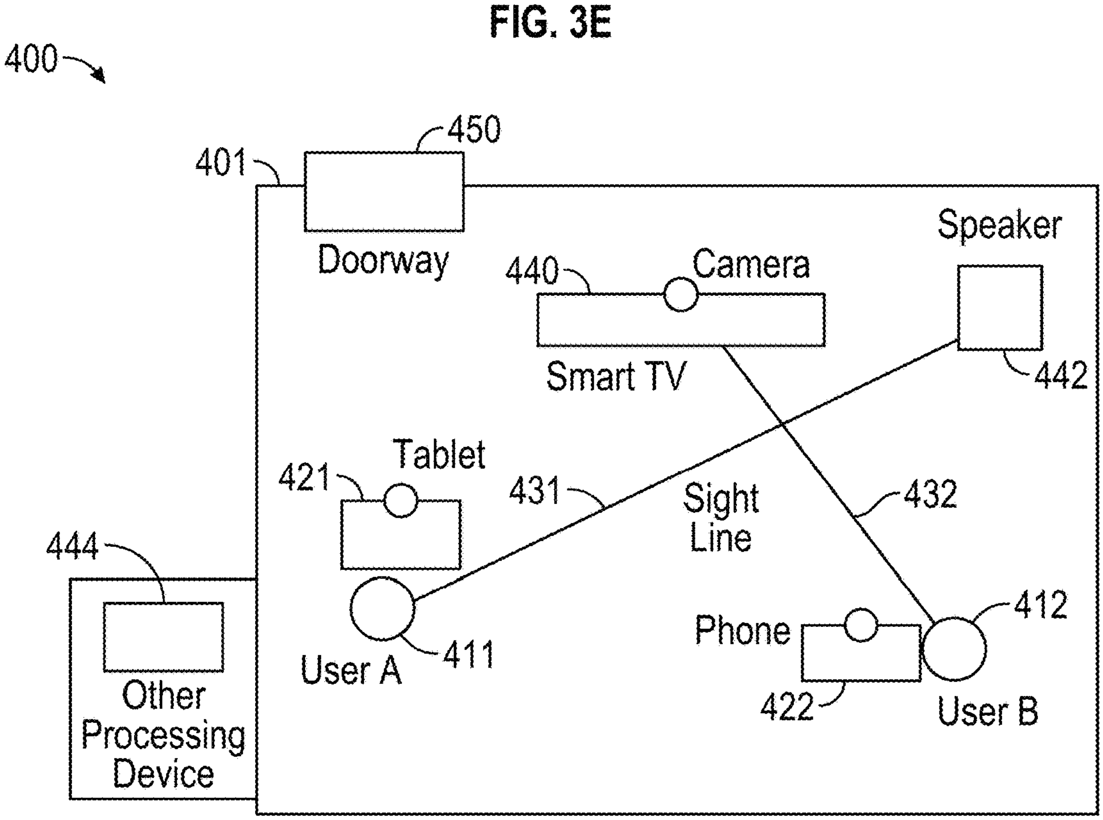
FIG. 4 shows an example of maintaining and modifying a 3D map of an environment for triangulating a plurality of gazes of a plurality of users, in accordance with various embodiments of the disclosure.

FIG. 4 shows an example 400 of maintaining and modifying a 3D map 401 of an environment for triangulating a plurality of gazes of a plurality of users, in accordance with various embodiments of the disclosure. In some embodiments, gaze mapping application determines the line of sight 431 of user (A) 411 (e.g., directed at speaker 442) by cross-references a collaboration of video data of user (A) 411 that is captured by multiple camera devices (e.g., smart TV 440, tablet 421, phone 422). Additionally, in some embodiments, gaze mapping application cross-references such video data of user (A)'s 411 presence at a first location (e.g., within the living room) with video data which captures user (A)'s 411 absence from a second location (e.g., within the closet). For example, another processing device 444 located in the closet may capture video feed of the closet area, indicating user (A)'s absence from the closet.

In some embodiments, the same camera devices (e.g., smart TV 440, tablet 421, phone 422, other processing device 444) also capture video feed of the user (A)'s eye movements or fail to capture such eye movements within the respective camera device's field of view. Gaze mapping application cross-references such video data of the eye movements to determine what the user (A) 411 is looking at as well as what he is not looking at.

In some embodiments, the same camera devices (e.g., smart TV 440, tablet 421, phone 422, other processing device 444) also capture video feed of any object or subject within their field of view, and gaze mapping application cross-references such video feeds to determine the position and line of sight 432 of user (B) 412, as well as for any other additional user in the environment.

In some approaches, collision volumes corresponding to certain points of interest are configured in the 3D map 401. For example, doorway 450 may be configured as a collision volume. If user (A) 411 triggers the collision volume of doorway 450, gaze mapping application cross-references such collision data with the time of collision and video feeds from the camera devices indicating where the user (A) 411 is present and where user (A) 411 is not present to determine whether the user (A) 411 has exited the room. In some embodiments, gaze mapping application switches the camera devices of the room to standby mode when it determines that no users are longer in the room or that the users have exited the room.

Figure 5A:
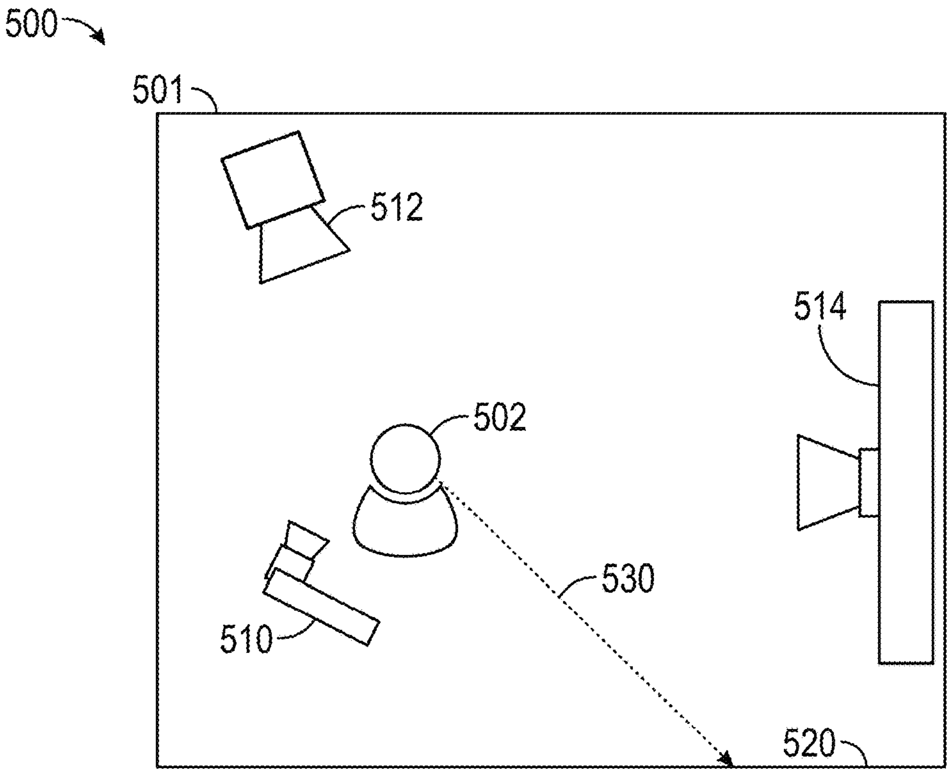
FIGS. 5A and 5B show example techniques for cross-referencing video data from a plurality of camera devices to determine a position of a user and/or position of a target object and/or line of sight of the user, in accordance with various embodiments of the disclosure.
Figure 5B:
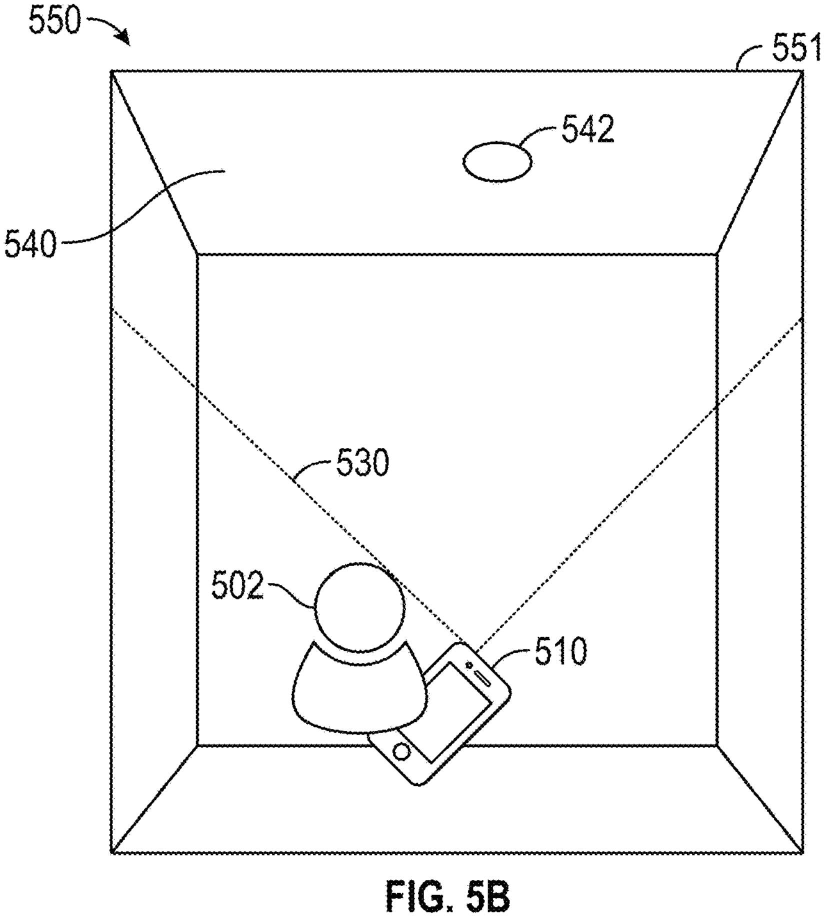

FIGS. 5A and 5B show examples 500, 550 techniques, respectively, for cross-referencing video data from a plurality of camera devices to determine a position of a user and/or position of a target object and/or line of sight of the user, in accordance with various embodiments of the disclosure. In some embodiments, in FIG. 5A, a user 502 is located in environment (e.g., room 501), represented as a 3D map 520 comprising a static mesh of the room 501 and a plurality of reference meshes representing objects therein (e.g., devices 510, 512, 514. The smart TV 514 (e.g., equipped with camera capabilities) captures first video data of the position of the user 502 and position of mobile phone 510, as well as second video data of eye movements of the user 502. Mobile phone 510 captures first video data of the user 502 and inertial sensor data (such as SLAM-based data) of its own position, as well as second video data of eye movements of the user 502. Virtual assistant 512 captures first video data of the position of the user 502 and position of mobile phone 510, as well as second video data of eye movements of the user 502. The gaze mapping application cross-references the position data from these multiple sources to determine the real-time 3D position of the user 502 and 3D position of the mobile device 510 with a certain degree of accuracy. The gaze mapping application also cross-references the eye movement data of the user 502 from the multiple sources as well as the 3D positions of the user 502 and mobile device 510 to estimate, with a certain degree of accuracy, a line of sight 530 of the user 502 and determine that the user 502 is gazing at the mobile device 510.

In some embodiments, gaze mapping application assigns collision volumes to various points of interest within the static mesh of 3D map 520. Gaze mapping application determines the gaze point of the user 502, based on determining that the line of sight 530 triggered (e.g., collided with) such collision volume.

In some embodiments, in FIG. 5B, gaze mapping application culls data from certain camera devices, or deactivates such camera devices, which are unable to capture sufficient data (e.g., due to the field of view, angle, or position of the camera device). For example, gaze mapping application may utilize data from mobile device 510 if the mobile device 510 is able to perform at least one of: (1) capture video feed of anchor object (e.g., known static object) 542 within its view; (2) capture sufficient video data to determine its own 3D position based on the view of the ceiling or walls 540 and/or its data from its internal spatial mapping, LIDAR, or image recognition in combination with cross-referencing the 3D map of room 551; or (3) user's 502 face is within view of the frustrum 530 of the camera of mobile device 510.

Figure 6A:
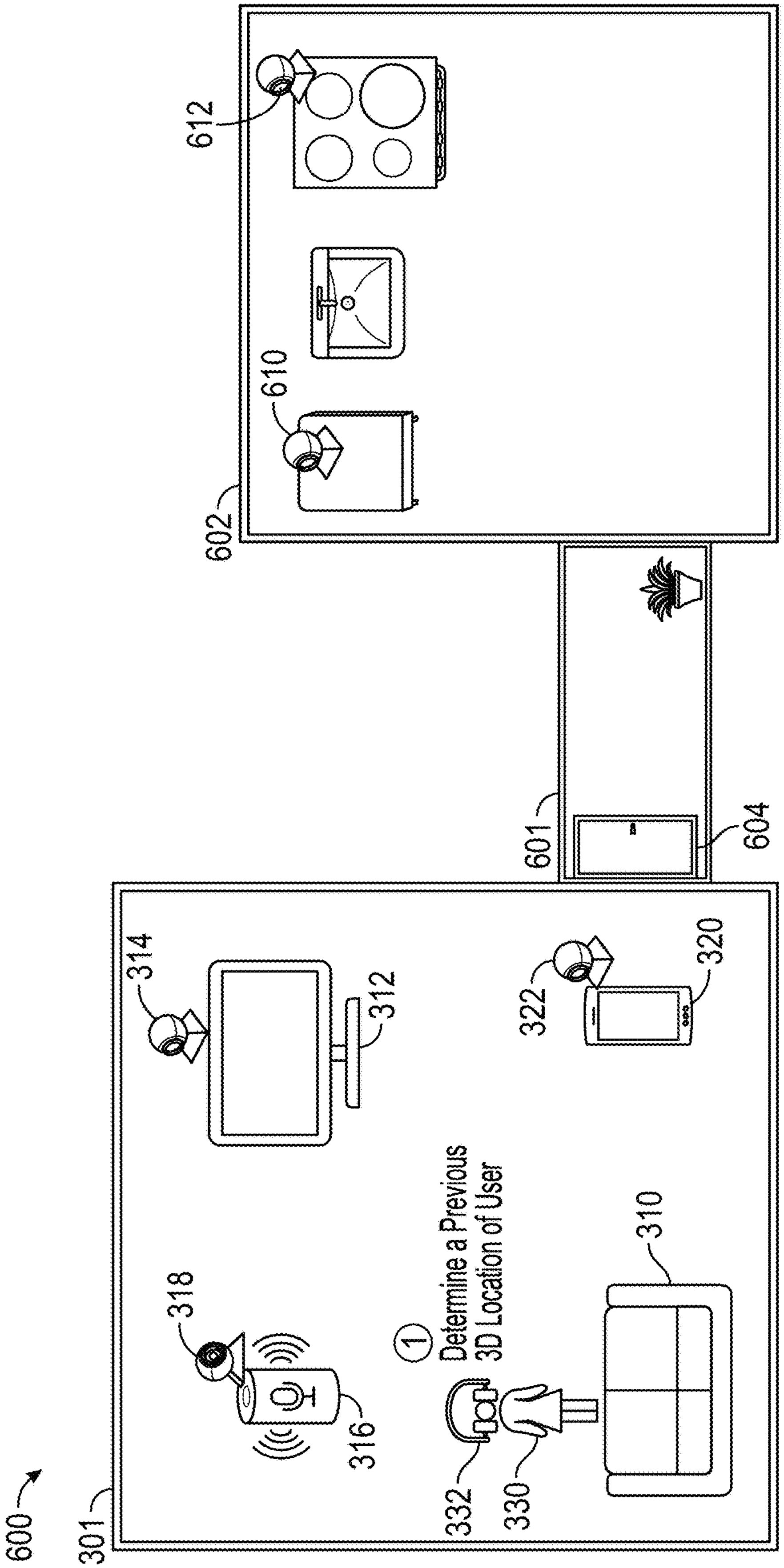
FIGS. 6A and 6B show an example scenario of estimating a gaze of a user when position of the user is in a blind spot, in accordance with various embodiments of the disclosure.
Figure 6B:
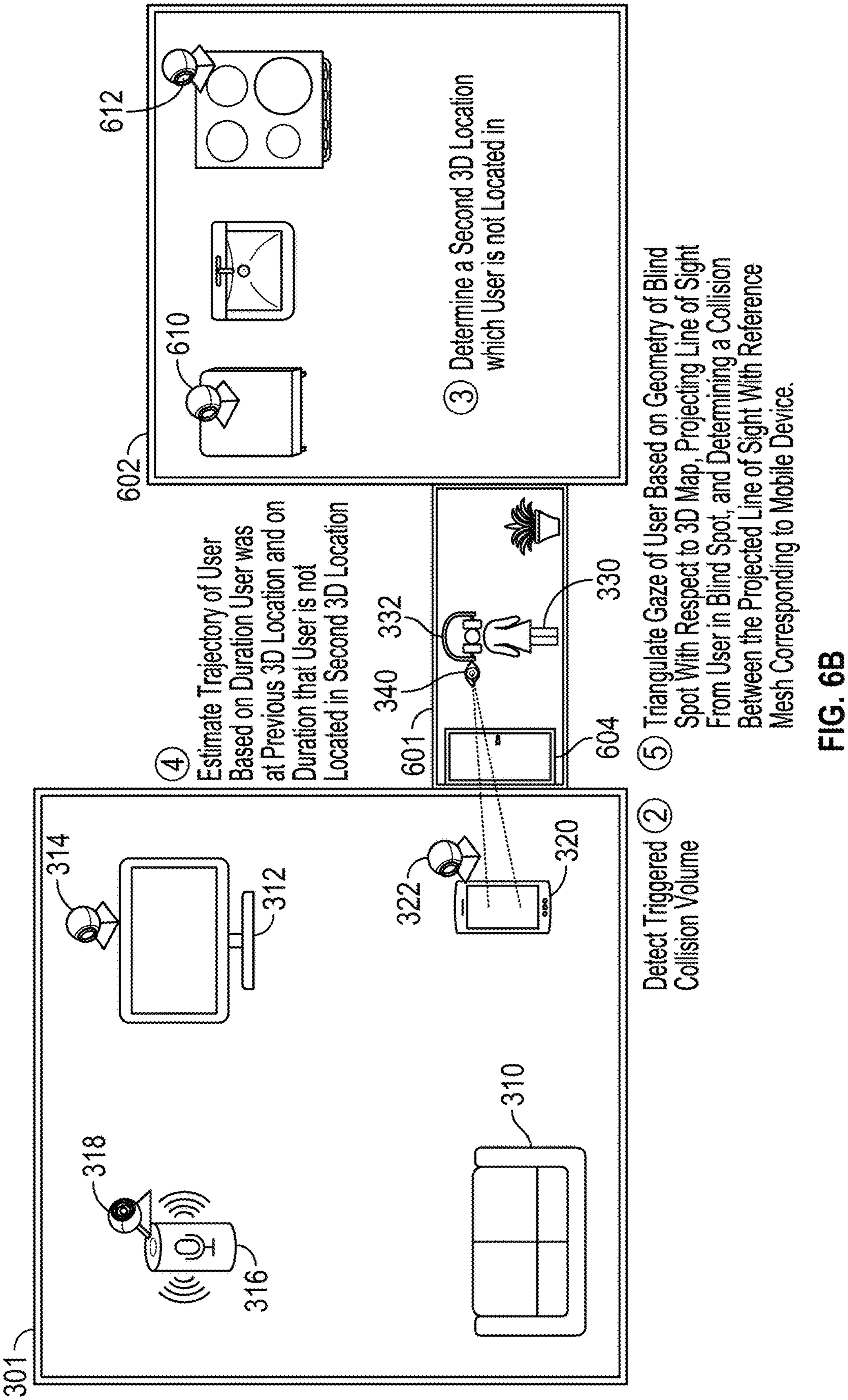

FIGS. 6A and 6B show an example scenario 600 of estimating a gaze of a user when position of the user is in a blind spot, in accordance with various embodiments of the disclosure. For example, a blind spot may comprise a portion or area of an environment which does not have tracking devices (e.g., camera devices) to capture position data or gaze data of a user and/or target object of the user's gaze. In some embodiments, at step 1 of FIG. 6A, the gaze mapping application determines a previous location of user 330. For example, position data of the user 330 cross-referenced from home assistant 316, smart TV 312, and mobile device 320 may indicate that user 330 was most recently located at sofa 310 in the living room 301. For example, gaze mapping application may monitor a user's location over time and maintain a ledger of user position history.

In some embodiments, gaze mapping application sets trigger points within the static mesh of the 3D map of the environment, by setting and activating collision volumes at various points of interest, such as doorway 604. At step 2 of FIG. 6B, the gaze mapping application detects that the user 330 triggered the collision volume corresponding to doorway 604. Based on this detection and based on the user's 330 previous location in the living room 301, gaze mapping application determines that the user 330 has exited the living room 301 and entered the corridor 601 (e.g., which may be a blind spot).

In some embodiments, at step 3 of FIG. 6B, gaze mapping application determines that the user 330 is not currently located in kitchen 602, based on cross-referenced video data from a plurality of camera devices 610, 612 indicating that user 330 is not currently present in kitchen 602. At step 4 of FIG. 6B, gaze mapping application estimates a trajectory of the user 330 (and/or a current position of the user 330 based on the estimated trajectory) based at least on the duration the user 330 was located at the previous 3D location (e.g., living room 301) and the duration that the user 330 was not located at a second 3D location (e.g., kitchen 602). Additionally, in some embodiments, gaze mapping application estimates the trajectory based on detecting that the user 330 triggered (or did not trigger) a collision volume and the time of the triggering. For example, gaze mapping application may detect that user 330 moved through doorway 604 at a certain time after being present in the living room 301. For example, gaze mapping application may also calculate that the user 330 did not enter kitchen 602 for a period of time after existing living room 301 and triggering collision volume at doorway 604. In some embodiments, gaze mapping application monitors the user's history of trigger and not triggering certain collision volumes, to estimate the user's trajectory and current position. Fr example, gaze mapping application may project the user's 330 trajectory based on a sequence of triggered and/or untriggered collision volumes over a period of time. Further in some embodiments, the gaze mapping application makes such determination of the user's current position in a blind spot (e.g., corridor 601) based on eliminating locations where the user is not located (e.g., kitchen 602), determined based on the user position history and failure to trigger certain collision volumes.

In some embodiments, at step 5 of FIG. 6B, gaze mapping application triangulates the gaze 340 of user 330 based on determining the geometry of the blind spot (e.g., corridor 601) with respect to the 3D map of living room 301, projecting the line of sight 340 from the user 330 in the blind spot, and determining a collision between the projected line of sight with a reference mesh corresponding to the target object (e.g., mobile device 320). For example, gaze mapping application may determine, based on determining that the user 330 is currently in the corridor 601 and based on the size, shape, and position of the blind spot in relation to the size, shape, and position of the living room 301, an estimated position within the corridor 601 where the user 330 is likely to be. In some approaches, gaze mapping application maintains a light of sight heat map, comprising points of interest on the 3D map which are reachable (e.g., viewable by a user) from various positions on the 3D map. For example, if a user is located in a particular space where a given point of interest cannot be seen by the user and/or cannot be captured from a camera device, gaze mapping application removes the point of interest from the list of candidate points of interest in the heat map (e.g., deactivates the collision volume corresponding to that point of interest, thereby saving computing resources and increasing computing efficiency of devices). Based on the user's 330 estimated position within the corridor 601 and the line of sight heat map, gaze mapping application projects a possible line of sight 340 of the user 330 from such position in the corridor 601. Gaze mapping application then identifies the target object (e.g., mobile device 320) corresponding to the collision volume in the 3D map with which the projected line of sight 340 collides.

Figure 7:
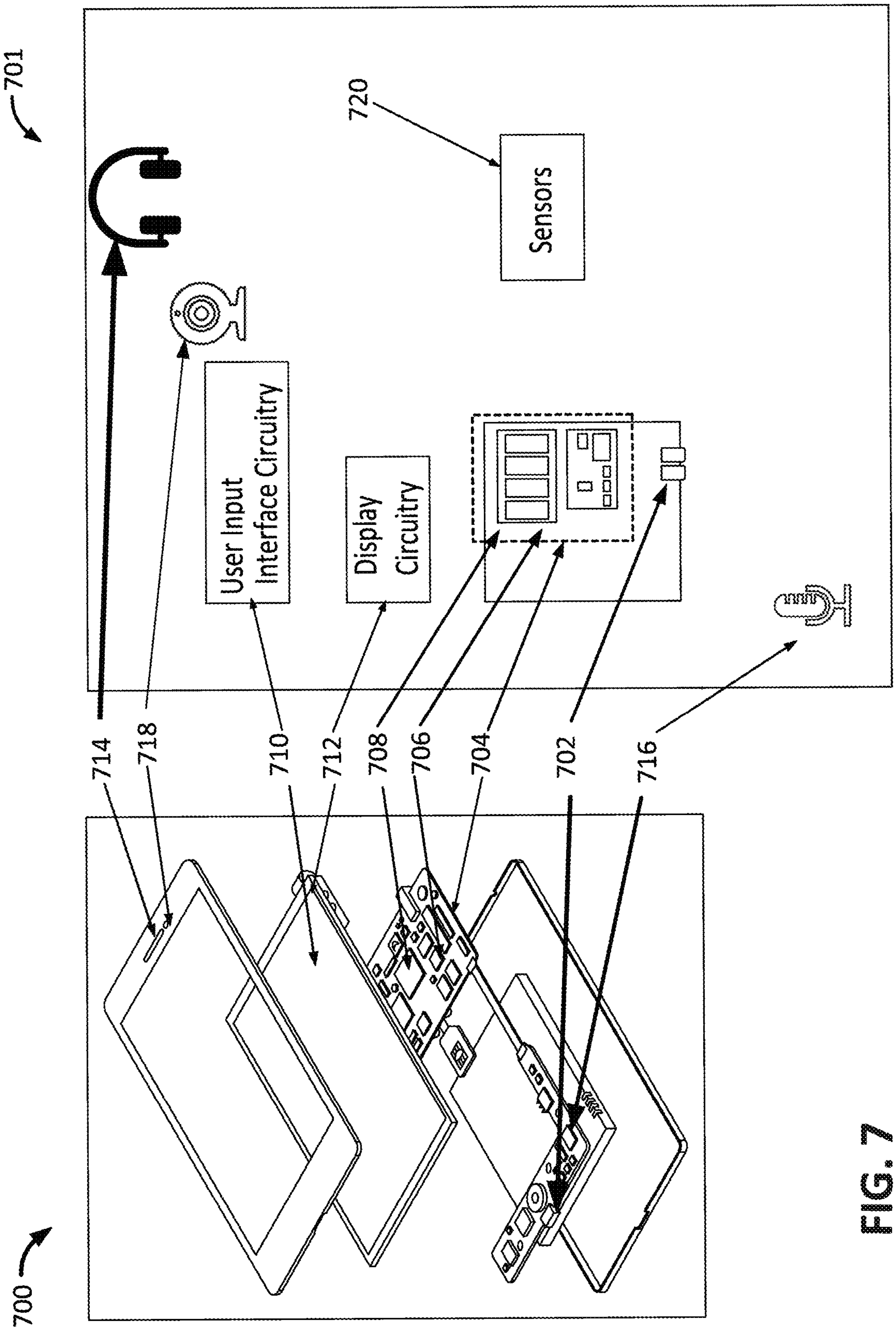
FIG. 7 shows an illustrative user equipment device, in accordance with some embodiments of this disclosure.
Figure 8:
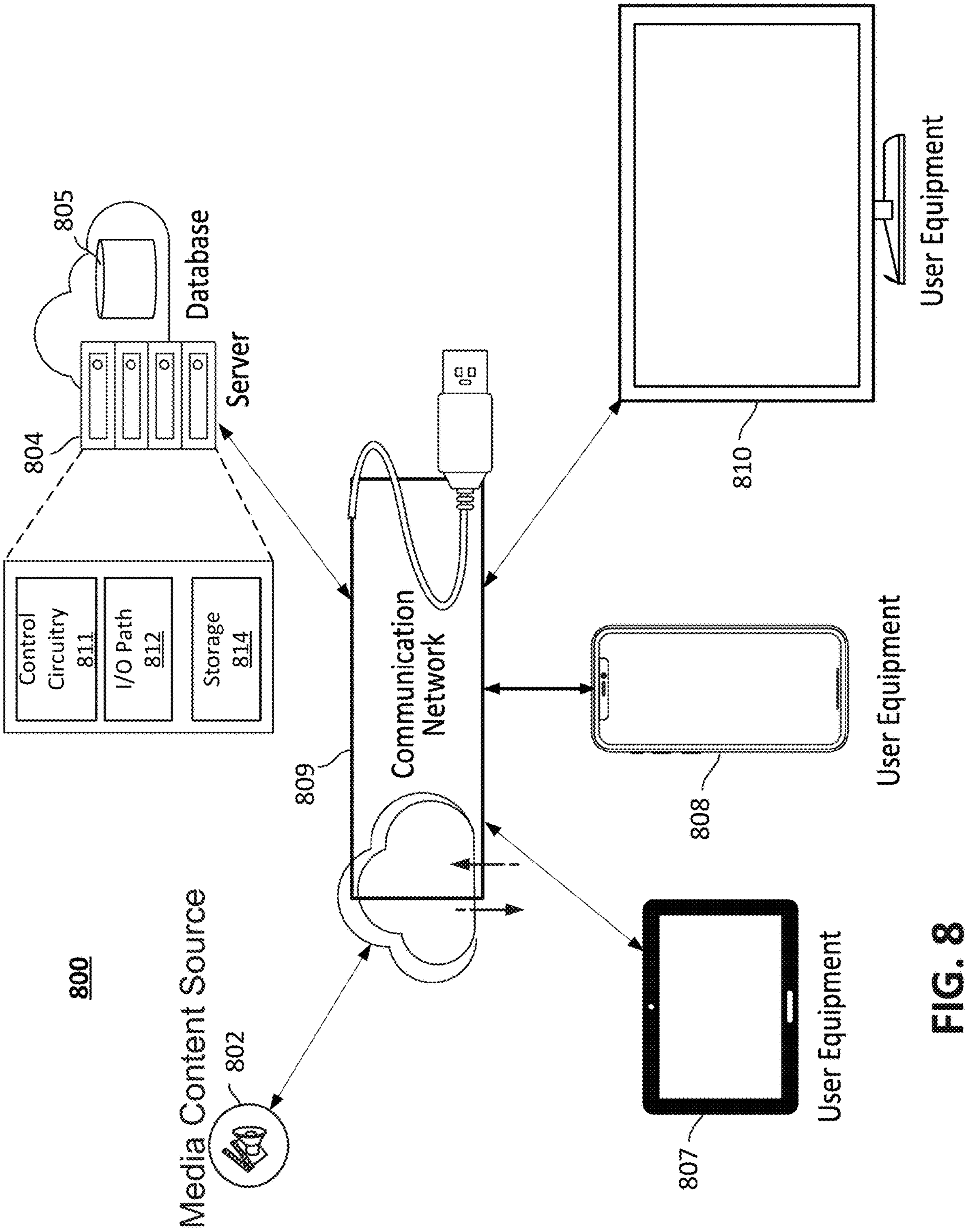
FIG. 8 shows an illustrative system, in accordance with some embodiments of this disclosure.

FIGS. 7-8 depict illustrative devices, systems, servers, and related hardware for switching audio based on gaze and triangulating dynamic gaze of a user, in accordance with some embodiments of this disclosure. FIG. 7 shows generalized embodiments of illustrative user equipment devices 700 and 701, which may correspond to the above-described user devices (e.g., device 113, 114, 316, 222, 312, 320, 440, 421, 422, 440, 444, 510, 512, 514, 610, 612). In some embodiments, user equipment device 700, 701 is a smartphone device, a tablet, smart TV, or any other suitable device capable of processing audio and/or video data, smart assistant device or home assistant device, a camera device or any other suitable computing device with camera functionality and/or sensors for tracking positions or movements of a subject or object, a network-based server hosting a user-accessible client device, a non-user-owned device, any other suitable device, or any combination thereof. Each of user equipment device 700, 701 is communicatively connected to at least one of microphone 716, audio input equipment (e.g., speaker or headphones 714, which may correspond to audio device 111, 112, 220, 332, 442), camera 718 (e.g. which may correspond to camera 140, 141, 142, 314, 318, 322), display circuitry 712, user input interface circuitry 710, and sensors 720. For example, sensors 720 may include eye tracking sensors, IR sensors, IR illuminators, accelerometers, and gyroscopes. For example, display 712 may be a television display or a computer display, a 3D display (such as, for example, a tensor display, a light field display, a volumetric display, a multi-layer display, an LCD display or any other suitable type of display, or any combination thereof). For example, user input interface 710 may be a remote-control device.

In some embodiments, each one of user equipment device 700, 701 receives content and data via input/output (I/O) path (e.g., circuitry) 702. I/O path 702 provides content (e.g., broadcast programming, on-demand programming, Internet content, content available over a local area network (LAN) or wide area network (WAN), and/or other content) and data to control circuitry 704, which comprises processing circuitry 706 and storage 708. Control circuitry 704 is used to send and receive commands, requests, and other suitable data using I/O path 702, which comprises I/O circuitry. I/O path 702 connects control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable control circuitry such as processing circuitry 706. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for the media application and/or gaze mapping application stored in memory (e.g., storage 708). Specifically, control circuitry 704 may be instructed by the media application and/or gaze mapping application to perform the functions discussed above and below. In some implementations, processing or actions performed by control circuitry 704 may be based on instructions received from the media application and/or gaze mapping application.

In some client/server-based embodiments, control circuitry 704 may include communications circuitry suitable for communicating with a server or other networks or servers. The media application and/or gaze mapping application is a stand-alone application implemented on a device or a server. The media application and/or gaze mapping application may be implemented as software or a set of executable instructions. The instructions for performing any of the embodiments discussed herein of the media application and/or gaze mapping application may be encoded on non-transitory computer-readable media (e.g., a hard drive, random-access memory on a DRAM integrated circuit, read-only memory on a BLU-RAY disk, etc.). For example, in FIG. 7, the instructions may be stored in storage 708, and executed by control circuitry 704 of a device 700, 701.

In some embodiments, the media application and/or gaze mapping application is a client/server application where only the client application resides on device 700 (e.g., device 113, 114, 316, 222, 312, 320, 440, 421, 422, 440, 444, 510, 512, 514, 610, 612), and a server application resides on an external server (e.g., server 804, server 160, server 161). For example, the media application and/or gaze mapping application may be implemented partially as a client application on control circuitry 704 of device 700, 701 and partially on server 804 as a server application running on control circuitry 811. Server 804 may be a part of a local area network with one or more of devices 700, 701 or may be part of a cloud computing environment accessed via the internet. In a cloud computing environment, various types of computing services for performing searches on the internet or informational databases, providing encoding/decoding capabilities, providing storage (e.g., for a database) or parsing data (e.g., using machine learning algorithms described above and below) are provided by a collection of network-accessible computing and storage resources (e.g., server 804), referred to as "the cloud." Device 700, 701 may be a cloud client that relies on the cloud computing capabilities from server 804 to receive and process encoded data for 3D media content. When executed by control circuitry of server 804, the media application and/or gaze mapping application instructs control circuitry 811 to perform processing tasks for the client device and facilitate the gaze-based audio switching and/or dynamic triangulation of the user's gaze.

Control circuitry 704 may include communications circuitry suitable for communicating with a server, edge computing systems and devices, a table or database server, or other networks or servers. The instructions for carrying out the above-mentioned functionality may be stored on a server (which is described in more detail in connection with FIG. 8). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as media application and/or gaze mapping application data described above. Nonvolatile memory may also be used (e.g., to launch a boot-up routine and other instructions). Cloud-based storage, described in relation to FIG. 7, may be used to supplement storage 708 or instead of storage 708.

Control circuitry 704 may include video generating circuitry and tuning circuitry, such as one or more analog tuners, one or more H.265 decoders or any other suitable digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of user equipment 700, 701. Control circuitry 704 may also include digital-to-analog converter circuitry and analog-to-digital converter circuitry for converting between digital and analog signals. The tuning and encoding circuitry may be used by user equipment device 700, 701 to receive and to display, to play, or to record content. The tuning and encoding circuitry may also be used to receive video encoding/decoding data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment device 700, the tuning and encoding circuitry (including multiple tuners) may be associated with storage 708.

Control circuitry 704 may receive instruction from a user by way of user input interface circuitry 710. User input circuitry 710 may be any suitable user interface circuitry, such as a remote control, mouse, trackball, keypad, keyboard, touch screen, touchpad, stylus input, joystick, voice recognition interface, or other user input interfaces. Display 712 circuitry may be provided as a stand-alone device or integrated with other elements of each one of user equipment device 700, 701. For example, display circuitry 712 may be a touchscreen or touch-sensitive display. In such circumstances, user input interface circuitry 710 may be integrated with or combined with display circuitry 712. In some embodiments, user input interface circuitry 710 includes a remote-control device having one or more microphones, buttons, keypads, any other components configured to receive user input or combinations thereof. For example, user input interface circuitry 710 may include a handheld remote-control device having an alphanumeric keypad and option buttons.

Audio output equipment 714 may be integrated with or combined with display circuitry 712. Display circuitry 712 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display circuitry 712. Audio output equipment 714 may be provided as integrated with other elements of each one of device 700 and equipment 701 or may be stand-alone units. An audio component of videos and other content displayed on display circuitry 712 may be played through speakers (or headphones) of audio output equipment 714. In some embodiments, audio may be distributed to a receiver (not shown), which processes and outputs the audio via speakers of audio output equipment 714. In some embodiments, for example, control circuitry 704 is configured to provide audio cues to a user, or other audio feedback to a user, using speakers of audio output equipment 714. There may be a separate microphone 716 or audio output equipment 714 may include a microphone configured to receive audio input such as voice commands or speech. For example, a user may speak letters or words that are received by the microphone and converted to text by control circuitry 704. In a further example, a user may voice commands that are received by a microphone and recognized by control circuitry 704. Camera 718 may be any suitable video camera integrated with the equipment or externally connected. Camera 718 may be a digital camera comprising a charge-coupled device (CCD) and/or a complementary metal-oxide semiconductor (CMOS) image sensor. Camera 718 may be an analog camera that converts to digital images via a video card.

The media application and/or gaze mapping application may be implemented using any suitable architecture. For example, it may be a stand-alone application wholly-implemented on each one of user equipment device 700 and user equipment device 701. In such an approach, instructions of the application may be stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to provide encoding/decoding functionality and preform any of the actions discussed herein. Based on the processed instructions, control circuitry 704 may determine what action to perform when input is received from user input interface circuitry 710. For example, movement of a cursor on a display up/down may be indicated by the processed instructions when user input interface circuitry 710 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the media application and/or gaze mapping application is a client/server-based application. Data for use by a thick or thin client implemented on each one of user equipment device 700 and user equipment device 701 may be retrieved on-demand by issuing requests to a server remote to each one of user equipment device 700 and user equipment device 701. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on device 700, 701. This way, the processing of the instructions is performed remotely by the server while the resulting displays (e.g., that may include text, a keyboard, or other visuals) are provided locally on device 700, 701. Device 700, 701 may receive inputs from the user via input interface circuitry 710 and transmit those inputs to the remote server for processing and generating the corresponding displays. For example, device 700, 701 may transmit a communication to the remote server indicating that an up/down button was selected via input interface circuitry 710. The remote server may process instructions in accordance with that input and generate a display of the application corresponding to the input (e.g., a display that moves a cursor up/down). The generated display is then transmitted to device 700, 701 for presentation to the user.

In some embodiments, the media application and/or gaze mapping application may be downloaded and interpreted or otherwise run by an interpreter or virtual machine (run by control circuitry 704). In some embodiments, the media application and/or gaze mapping application may be encoded in the ETV Binary Interchange Format (EBIF), received by control circuitry 704 as part of a suitable feed, and interpreted by a user agent running on control circuitry 704. For example, the media application and/or gaze mapping application may be an EBIF application. In some embodiments, the media application and/or gaze mapping application may be defined by a series of JAVA-based files that are received and run by a local virtual machine or other suitable middleware executed by control circuitry 704. In some of such embodiments (e.g., those employing MPEG-2 or other digital media encoding schemes), media application and/or gaze mapping application may be, for example, encoded and transmitted in an MPEG-2 object carousel with the MPEG audio and video packets of a program.

FIG. 8 is a diagram of an illustrative system 800 for encoding and/or decoding of 3D media content, in accordance with some embodiments of this disclosure. System 800 may comprise user equipment devices 807, 808, and/or 810 and/or any other suitable number and types of user equipment, capable of transmitting data by way of communication network 809. Communication network 809 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 809) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 8 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 809.

System 800 may comprise media content source 802 (e.g., corresponding to servers 160, 161) and/or one or more servers 804. In some embodiments, the media application and/or gaze mapping application may be executed at one or more of control circuitry 811 of server 804 (and/or control circuitry of user equipment devices 807, 808, 810).

In some embodiments, server 804 includes control circuitry 811 and storage 814 (e.g., RAM, ROM, Hard Disk, Removable Disk, etc.). Storage 814 may store one or more databases. Server 804 may also include an input/output path 812. I/O path 812 may provide encoding/decoding data, device information, or other data, over a local area network (LAN) or wide area network (WAN), and/or other content and data to control circuitry 811, which may include processing circuitry, and storage 814. Control circuitry 811 may be used to send and receive commands, requests, and other suitable data using I/O path 812, which may comprise I/O circuitry. I/O path 812 may connect control circuitry 811 (and specifically control circuitry) to one or more communications paths.

Control circuitry 811 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 811 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 811 executes instructions for an emulation system application stored in memory (e.g., the storage 814). Memory may be an electronic storage device provided as storage 814 that is part of control circuitry 811.

Media content source 802, server 804, or any combination thereof, may include an encoder. Such encoder may comprise any suitable combination of hardware and/or software configured to process data to reduce storage space required to store the data and/or bandwidth required to transmit the image data, while minimizing the impact of the encoding on the quality of the media content being encoded. In some embodiments, the data to be compressed may comprise a raw, uncompressed 3D media content, or 3D media content in any other suitable format. In some embodiments, each of user equipment devices 807, 808 and/or 810 may receive encoded or encoded data locally or over a communication network (e.g., communication network 809 of FIG. 8) and may comprise one or more decoders. Such decoder may comprise any suitable combination of hardware and/or software configured to convert data in a coded form to a form that is usable as video signals and/or audio signals or any other suitable type of data signal, or any combination thereof. User equipment devices 807, 808 and/or 810 may be provided with encoded data, and may be configured to implement one or more machine learning models to modify delivery of audio portion of media streams based on detected gaze and/or triangulate a dynamic gaze of a user. In some embodiments, at least a portion of decoding may be performed remote from user equipment devices 807, 808 and/or 810.

FIGS. 9-12 are flowcharts of various processes 900-1200, respectively. In various embodiments, the individual steps of each process 900-1200 may be implemented by one or more components of the devices and systems of FIGS. 7-8. Although the present disclosure may describe certain steps of each process 900-1200 (and of other processes described herein) as being implemented by certain components of the devices and systems of FIGS. 7-8, this is for purposes of illustration only, and it should be understood that other components of the devices and systems of FIGS. 7-8 may implement those steps instead. For example, the steps of each process 900-1200 may be executed by server 804 and/or by user equipment device 807, 808, and/or 810 and/or by control circuitry 704 of a device 700, 701 to switch audio based on user's gaze and/or dynamically triangulate the user's gaze.

Figure 9:
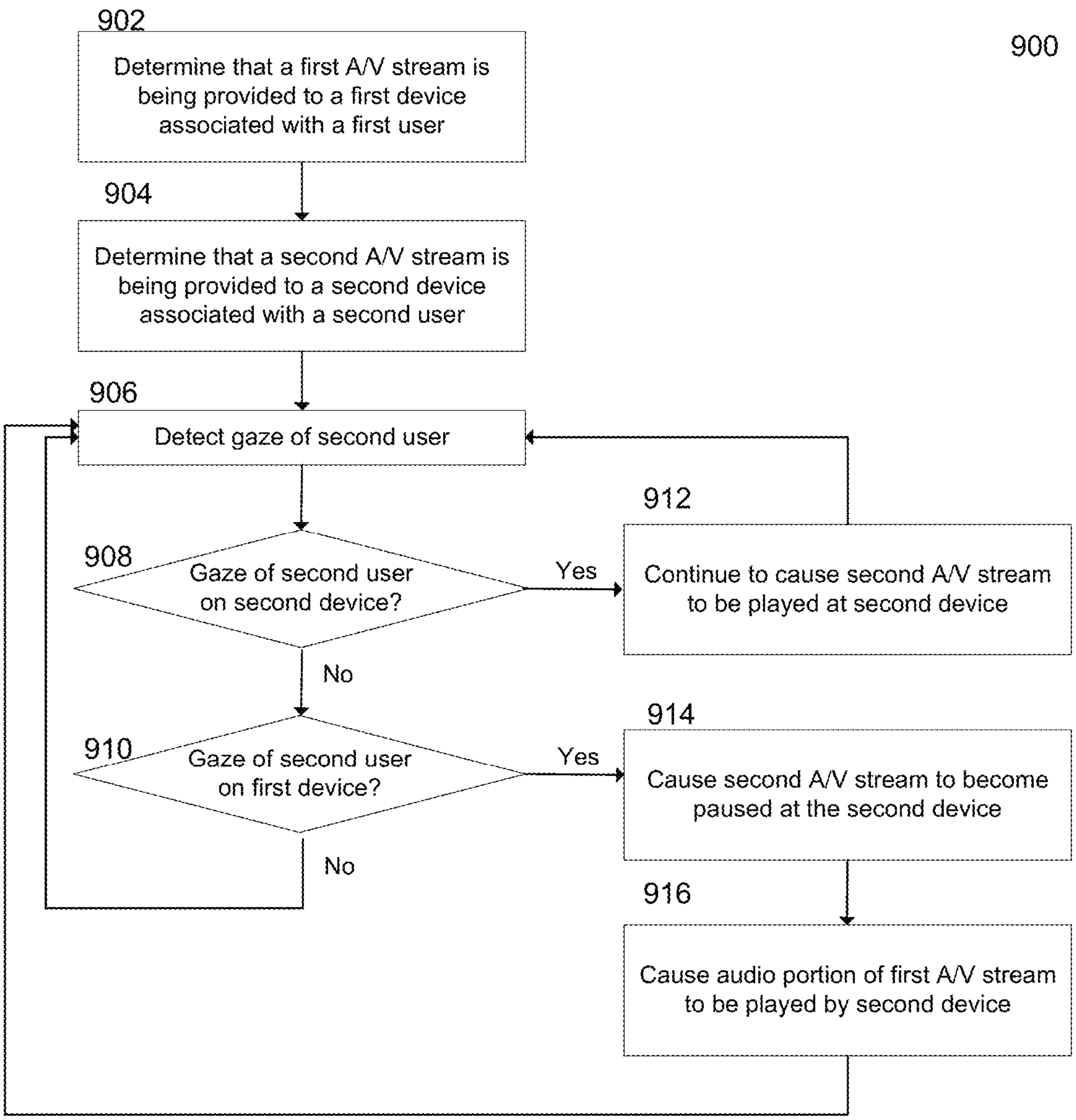
FIG. 9 is a flowchart of a detailed illustrative process for switching audio based on gaze, in accordance with various embodiments of the disclosure.

FIG. 9 is a flowchart 900 of a detailed illustrative process for switching audio based on gaze, in accordance with various embodiments of the disclosure. In various embodiments, the individual steps of process 900 may be implemented by one or more components of the devices and systems of FIGS. 7-8. Although the present disclosure may describe certain steps of process 900 (and of other processes described herein) as being implemented by certain components of the devices and systems of FIGS. 7-8, this is for purposes of illustration only, and it should be understood that other components of the devices and systems of FIGS. 7-8 may implement those steps instead. For example, the steps of process 900 may be executed by server 804 and/or by user equipment device 807, 808, and/or 810 and/or by control circuitry 704 of a device 700, 701 to detect a user's gaze and modify delivery of the audio portion of a media stream to a user's device based on the detected user's gaze.

In some embodiments, at step 902, the control circuitry (e.g., control circuitry 811 and/or control circuitry 704) determines that a first audio/video stream is being provided to a first device associated with a first user. At step 904, the control circuitry determines that a second audio/video stream is being provided to a second device associated with a second user. In some embodiments, the first and second devices are connected to the same network (e.g., same local wireless network) and are within a certain distance of each other. For example, the first user and second user may be viewing their respective devices while sitting next to each other in the same vehicle or same room. In some embodiments, the first and second audio/video streams are provided the same content provider. Alternatively, the first and second audio/video streams are provided by different content providers.

In some embodiments, at step 806, the control circuitry detects the gaze of the second user. For example, the control circuitry may monitor the gaze of each user using eye tracking data of each user captured by the user's associated device or other camera device in the environment. For example, the control circuitry may determine the real-time gaze of each user using a modified 3D gaze map of the environment.

In some embodiments, at step 908, if the control circuitry detects that the gaze of the second user is directed to her own device (e.g., the second device), then the control circuitry continues to distribute the second audio/video stream to the second device, such that the second device continues playback of the second audio/video stream.

In some embodiments, at step 910, if the control circuitry detects that the gaze of the second user is directed to the device of the first user (e.g., the first device), then the control circuitry causes the second audio/video stream to become paused at the second device at step 914 and causes the audio portion of the first audio/video stream to be played by the second device. For example, the control circuitry may request from the appropriate content provider a replicate of the audio portion of the first audio/video stream. The control circuitry may decode, mix, combine, and encode the audio portion and distribute it to the second audio device until the second user ceases gazing at the first device, at which point, the control circuitry causes the second audio/video stream to resume playback at the second device.

Figure 10:
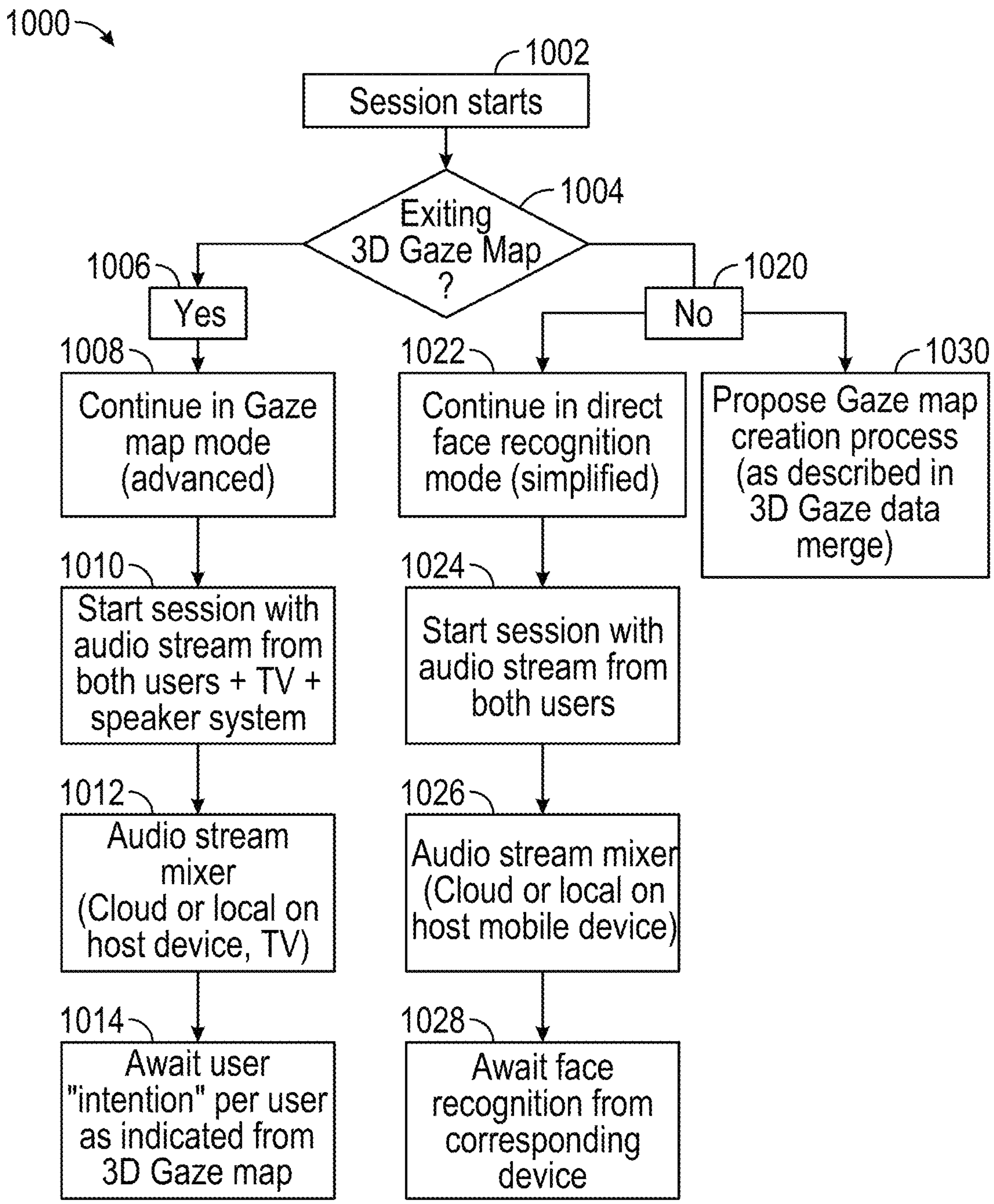
FIG. 10 is a flowchart of a detailed illustrative process using face recognition to determine audio switching, in accordance with various embodiments of the disclosure.

FIG. 10 is a flowchart 100 of a detailed illustrative process using face recognition to determine audio switching, in accordance with various embodiments of the disclosure. In some embodiments, at step 1002, users in a shared environment consume content on their respective computing devices. For instance, two users may be sitting next to each other in the living room, each consuming content on their own respective smartphones. In some embodiments, at step 1004, the control circuitry (e.g., control circuitry 811 and/or control circuitry 704) determines whether a 3D gaze map is available for detecting the gaze of each user, wherein the 3D gaze map indicates the real-time gaze of a user in an environment. At step 1006, if such 3D gaze map is available, then at least a camera device in the environment captures gaze data (e.g., eye tracking data) of the users and the control circuitry infers each user's intent with respect to devices based on gaze data of the user. For instance, if the control circuitry detects a second user's gaze is directed to a first user's device, the control circuitry infers that the user intends to listen to the accompany audio of the content playing on the first user's device and processes the second user's gaze as input requesting such audio. At step 1010, the control circuitry distributes content to various devices of each user (or common devices, such as smart TV). At step 1012, an audio stream mixer decodes, mixes, combines, and encodes the audio portion associated with the content displayed on the device at which a user directs their gaze. At step 1014, when the control circuitry determines that the second user's gaze is directed to the first user's device (e.g., as indicated by the 3D gaze map), the control circuitry distributes to the second user the audio portion of the content playing at the first user's device.

In some embodiments, at step 1020, if no such 3D gaze map is available, the control circuitry determines user's intent and validates whether the user is authorized to view content (and/or authorized to access the device playing such content) based on face recognition. For example, various camera devices in the environment may capture image data of each user. At step 1024, control circuitry distributes content to various devices of each user (or common devices, such as smart TV). At step 1026, an audio stream mixer decodes, mixes, combines, and encodes the audio portion associated with the content displayed on the device at which a user is authorized to view. At step 1028, the control circuitry determines, based on image recognition of the second user's face looking at the first user's device, that the second user is authorized to view the content on the first user's device, the control circuitry distributes to the second user the audio portion of the content playing at the first user's device.

Figure 11:
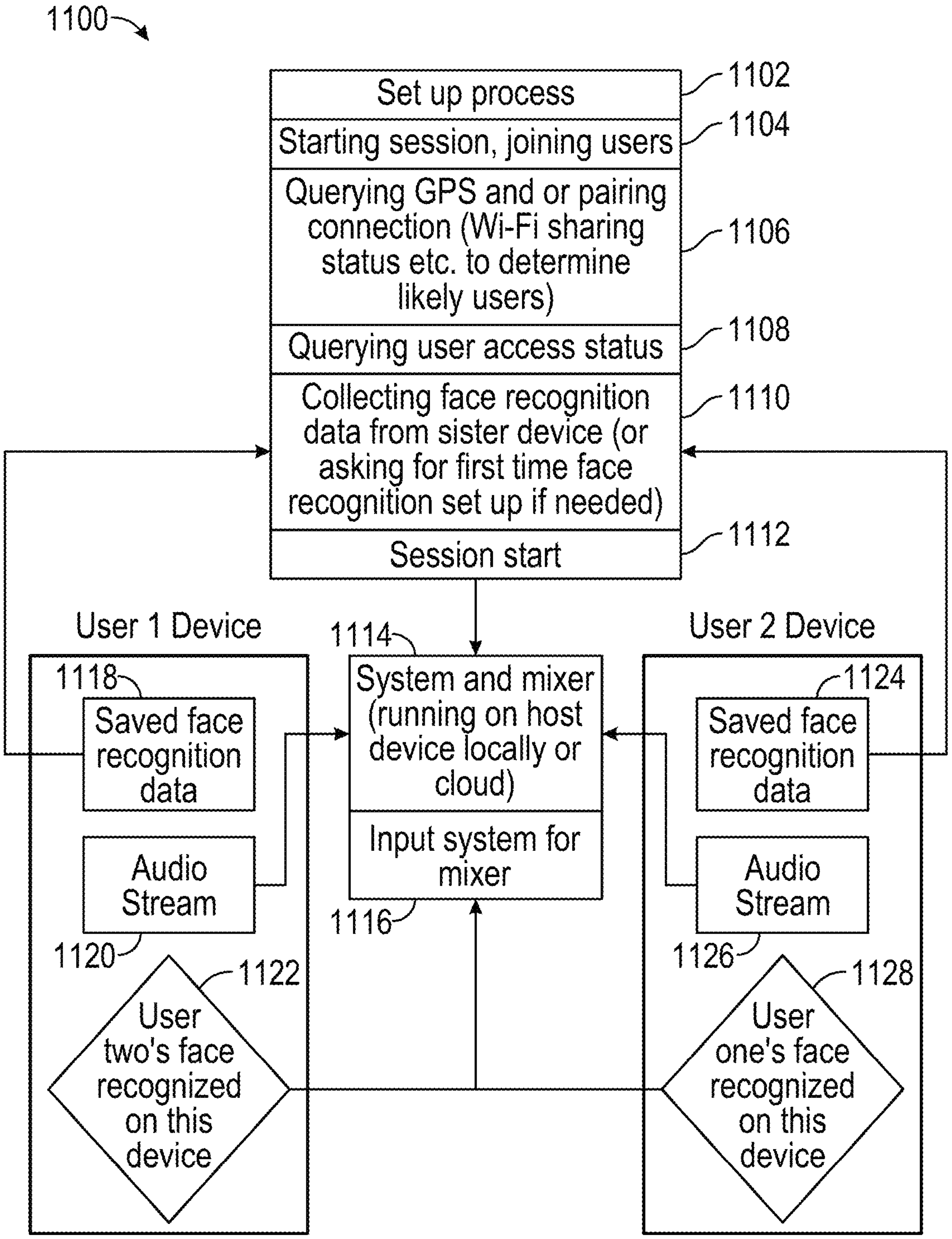
FIG. 11 is flowchart of another detailed illustrative process using face recognition to determine audio switching, in accordance with various embodiments of the disclosure.

FIG. 11 is flowchart 1100 of another detailed illustrative process using face recognition to determine audio switching, in accordance with various embodiments of the disclosure. In some embodiments, at steps 1102 and 1104, the control circuitry (e.g., control circuitry 811 and/or control circuitry 704) begins a media session, providing media content to users who connect to the same network. At steps 1106 and 1108, the control circuitry identifies the users, their associated devices, and their access status (e.g., whether a user is authorized to view certain content and/or access the displays of certain content consuming devices). At step 1110, the control circuitry collects face recognition data for identifying the users. At step 1114, the control circuitry distributes content streams to each user device.

In some embodiments, for user (1) device (e.g., associated with user (1)), at step 1118, the control circuitry maintains and stores face recognition data of users who are authorized to access content on the user (1) device. At step 1122, if user (2) looks at the display of user (1)'s device to view a first content stream, and at step 1116 if the control circuitry recognizes the user (2) as being authorized to view the user (1) device, then at step 1120 the user (1) device sends the decoded audio portion of the first content stream to the mixer, which routes the decoded audio portion to the user (2) device.

In some embodiments, for user (2) device (e.g., associated with user (2)), at step 1124, the control circuitry maintains and stores face recognition data of users who are authorized to access content on the user (2) device. At step 1128, if user (1) looks at the display of user (2)'s device to view a second content stream, and at step 1116 if the control circuitry recognizes the user (1) as being authorized to view the user (2) device, then at step 1126 the user (2) device sends the decoded audio portion of the second content stream to the mixer, which routes the decoded audio portion to the user (1) device.

Figure 12:
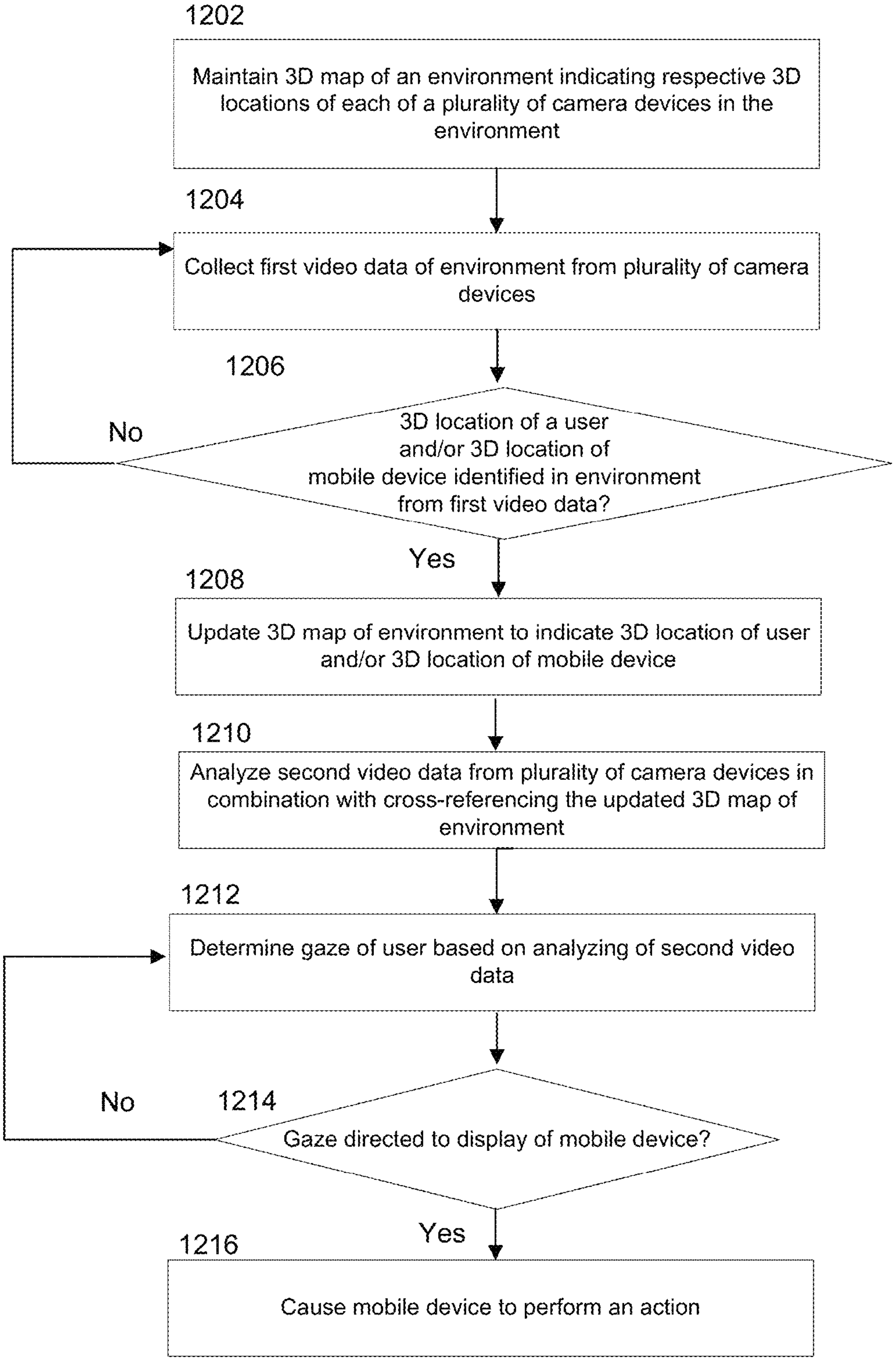
FIG. 12 is a flowchart of a detailed illustrative process for triangulating dynamic gaze of a user, in accordance with various embodiments of the disclosure.

FIG. 12 is a flowchart 1200 of a detailed illustrative process for triangulating dynamic gaze of a user, in accordance with various embodiments of the disclosure. In some embodiments, at step 1202, the control circuitry (e.g., control circuitry 811 and/or control circuitry 704) maintains a 3D map of an environment. The 3D map comprises a static mesh representation of the environment and reference mesh representation of objects and subjects therein. The 3D map indicates 3D locations of a plurality of camera devices in the environment.

In some embodiments, at step 1204, the control circuitry collects first video data of position data of dynamic subjects and/or objects (e.g., a user and/or the target object of the user's gaze, respectively) in the environment. The first video data comprises a plurality of video feeds captured by each of the plurality of camera devices.

In some embodiments, at step 1206, the control circuitry determines whether the 3D location of the user and/or target object (e.g., mobile device at which the user is viewing) is determined from the first video data. For example, the control circuitry cross-references the position data from the multiple video feeds of the plurality of camera devices to determine the real-time position of the user and/or mobile device with increased accuracy. If the 3D location of the user and/or mobile device have been determined from the first video feed, then at step 1208 the control circuitry updates the 3D map to indicate the 3D location of the user and/or mobile device.

In some embodiments, at step 1210, the control circuitry analyzes second video data from the camera devices in combination with cross-referencing the updated 3D map of the environment. The second video data comprises gaze data (e.g., eye tracking data, such as eye movement data, head gaze and/or head position data) of the user. For example, the plurality of camera devices may capture multiple video feeds of the user and use sensors to track the user's eye movements. The control circuitry combines the gaze data from the multiple video feeds and cross-references the combined gaze data with the positions of the user and/or mobile device as indicated in the updated 3D map. At step 1212, based on the cross-referencing, the control circuitry determines the gaze of the user by estimating a projected line of sight of the user.

In some embodiments, at step 1214, the control circuitry determines whether the gaze of the user is directed to the display of the mobile device. For example, the control circuitry may determine that the projected line of sight of the user collides (e.g., intersects) with a collision volume corresponding to a reference mesh representing the mobile device in the updated 3D map. The triggering of such collision volume by the projected line of sight indicates that the mobile device is located at the focal point of the user's gaze.

In some embodiments, at step 1216, in response to determining that the user's gaze is directed to the mobile device, the control circuitry causes the mobile device to perform an action. For example, the mobile device may direct an audio stream (e.g., which is associated with the content stream currently playing on the mobile device) to an audio device (e.g., headphones) of the user. For example, if the user's gaze is directed to a specific portion of the mobile device (e.g., a particular graphical icon on the screen of the mobile device which corresponds to a mobile application), the control circuitry may cause the mobile device to execute the mobile application.

Figure 13:
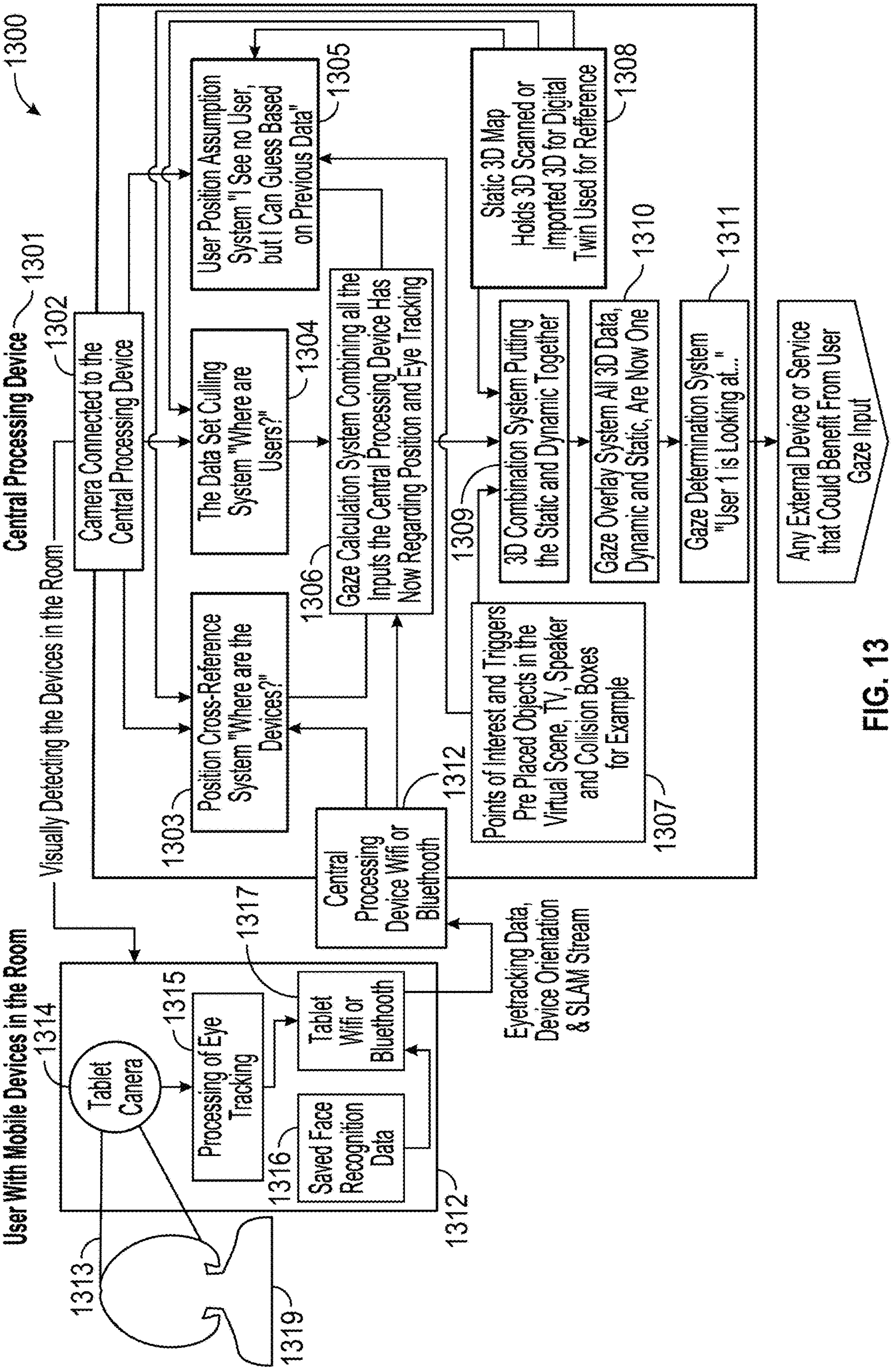
FIG. 13 is a flowchart of another detailed illustrative process for triangulating dynamic gaze of a user, in accordance with various embodiments of the disclosure.

FIG. 13 is an example system 1300 for triangulating dynamic gaze of a user, in accordance with various embodiments of the disclosure. In some embodiments, central processing device 1301 merges the data (e.g., video feeds of position of the user 1319 and/or target mobile device 1313, or eye tracking data of the user 1319) captured by a plurality of camera devices in the environment into one cohesive 3D gaze map. For example, central processing device 1301 may comprise a smart TV, gaming consoles, a laptop, mobile devices, or other suitable computing device.

In some embodiments, camera 1302 is communicatively connected to the central processing device 1301. For example, camera 1302 may comprise cameras integrated with a mobile device or other computing device, CCV camera or other surveillance equipment, or any other suitable device capable of capturing and transmitting video streams.

In some embodiments, the control circuitry, by way of pposition cross-reference component 1303, cross-references position data captured by multiple devices (e.g., using inertial sensors and/or cameras).

In some embodiments, the control circuitry, by way of dataset culling component 1304, culls out irrelevant data, such as data which cannot be determined in 3D space or is not likely to contribute to accurate tracking of a subject which is already being tracked by another camera device in the environment. For example, if the control circuitry determines that lighting conditions for a camera device are under a particular quality or the distance between the camera device and the subject are beyond a certain distance, then the control circuitry may cull video data from such camera device. For example, the control circuitry may score such video data from such camera device with a low score. Camera devices with a score below a threshold are excluded from data capture and calculations. The score may increase if the conditions of the camera device for capturing relevant data changes (e.g., lighting conditions around the camera device improve, or the camera device is positioned at an optimal angle or distance to the subject).

In some embodiments, the control circuitry, by way of position assumption component 1305, configures 3D meshes in the 3D map that act as triggers (e.g., collision volumes) to determine if users move between rooms. For example, if user 1319 collides with the kitchen door collider, or if the user 1319 is at the same time not detected in the room, the control circuitry may assume that the user 1319 has exited the living room and entered into the kitchen.

In some embodiments, the control circuitry, by way of gaze calculation component 1306, receives eye tracking data from each camera device in a room and outputs a dataset indicating where each user is looking compared to the device camera. The control circuitry determines the identity of a user from several streams of video and assigns a tag to the user and their associated device(s) to streamline compilation of the data (e.g., avoid collecting and processing further additional streams for the same task of identifying the user). The control circuitry cross-references the position data and eye tracking data from multiple video streams of multiple camera devices. The control circuitry additionally rates the accuracy of such data. The control circuitry determines whether the combined data reaches a certain level of accuracy and selects data points having such level accuracy to draw a line of sight. The line of sight is weighted to a median between the different data points in the hierarchy of confidence. Thus, the rendered line of sight will be associated with the compiled confidence level from all of the device inputs (e.g., data sources such as camera devices) which were identified as relevant or having high confidence by dataset culling component 1304. The control circuitry extends the line of sight from the user's eye until it makes contact with any collision mesh (e.g., point of interest) or the static mesh of the environment. The collision indicates the identity of the target object (e.g., focal point of the gaze) and the 3D location of such target option.

In some embodiments, points of interests 1307 are represented in the 3D map as collision volumes. Static 3D map 1308 of the environment comprises polygonal collision and reference meshes representing objects within the environment.

In some embodiments, mobile device 1313 is equipped with camera 1314 and/or sensors which can capture and process eye tracking data 1315 of the user. Mobile device 1313 can also save face recognition data 1316 of authorized users who are allowed to access the mobile device 1313.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

maintaining a 3D map of an environment, the 3D map indicating respective 3D locations of each of a plurality of camera devices in the environment, wherein each of the plurality of camera devices is capable of capturing video data of the environment;

analyzing first video data from the plurality of camera devices to identify:

(a) a 3D location of a user in the environment, wherein identifying the 3D location of the user is based on:

estimating a trajectory of the user based on prior data received from the plurality of cameras; and determining, based on the estimated trajectory of the user, that the 3D location of the user is in a blind spot comprising a region in the 3D map of the environment in which no camera devices are present; and (b) a 3D location of a mobile device in the environment;

updating the 3D map of the environment indicating the 3D location of the user and the 3D location of the mobile device, wherein the 3D map of the environment comprises a plurality of reference data structures;

triangulating a gaze of the user located in the blind spot based on:

calculating a geometry of the blind spot with respect to the 3D map of the environment;

projecting a line of sight from the user in the blind spot based on the calculated geometry of the blind spot and the estimated trajectory of the user; and determining a collision between the projected line of sight with a reference data structure of the plurality of reference data structures corresponding to the mobile device;

determining that the gaze of the user is directed to a display of the mobile device based on the triangulating; and based on the determining that the gaze of the user is directed to the display of the mobile device, causing the mobile device to perform an action.

2. The method of claim 1, wherein the first video data includes at least one of 3D location data of the user or 3D location data of the mobile device.

3. The method of claim 1, wherein the mobile device in the environment is capable of capturing video data of the environment.

4. The method of claim 3, wherein the gaze is further determined based on second video data from the plurality of camera devices that includes at least one of eye movement data or head position data of the user captured by at least one of the plurality of devices or by the mobile device; and wherein analyzing the second video data from the plurality of camera devices in combination with cross-referencing the updated 3D map of the environment is based on:

receiving, from each of the plurality of camera devices and the mobile device, the at least one of eye movement data or head position data of the user;

projecting a line of sight of the user based on cross-referencing the at least one of eye movement data or head position data of the user from each of the plurality of camera devices and the mobile device and using the updated the 3D map; and triangulating the gaze of the user based on the cross-referenced line of sight in the updated 3D map.

5. The method of claim 4, wherein the plurality of reference data structures is a plurality of reference meshes, wherein at least one of the plurality of reference meshes corresponds to the mobile device; and wherein the determining that the gaze of the user is directed to the display of the mobile device is further based on:

determining a focal point of the triangulated gaze of the user; and determining a collision of the focal point with the at least one of the plurality of reference meshes corresponding to the mobile device.

6. The method of claim 1, wherein the plurality of reference data structures is a plurality of reference meshes, wherein at least one of the plurality of reference meshes comprises a collision volume corresponding to a particular 3D location in the environment.

7. The method of claim 6, wherein identifying the 3D location of the user in the environment is based on:

determining, based on the first video data, that the collision volume is triggered by the user colliding with the collision volume.

8. The method of claim 6, further comprising:

determining a previous 3D location of the user, based on a most recent trigger of the collision volume; and determining the second 3D location which the user is not located in, based on non-triggering of a second collision volume corresponding to the second 3D location in the environment.

9. The method of claim 1, wherein the 3D location of the mobile device is further identified based on:

receiving, from the mobile device, simultaneous localization and mapping (SLAM) data or inertial sensor data of the mobile device; and cross-referencing the SLAM or inertial sensor data of the mobile device with the first video data from the plurality of camera devices.

10. The method of claim 1, wherein the identifying the 3D location of the user in the environment is further based on:

receiving, from each of the plurality of camera devices, an image;

recognizing the image as the user;

measuring a distance between each of the plurality of the camera devices and the user; and cross-referencing the distance between each of the plurality of camera devices and the user with each other.

11. The method of claim 1, further comprising:

determining a change in the 3D location of the user; and updating the plurality of camera devices to include devices which can capture at least one of eye movements or head position of the user at the changed 3D location of the user.

12. The method of claim 1, further comprising:

determining a change in the 3D location of the mobile device; and updating the plurality of camera devices to include devices which can capture video data of the mobile device at the changed 3D location of the mobile device.

13. The method of claim 1, wherein the action comprises at least one of: playing media content, sharing media content, causing a second device to play media content which is already playing on the mobile device, playing media content on the mobile device which is already playing on the second device, or activating a household appliance.

14. The method of claim 1, further comprising:

determining that the gaze of the user is no longer directed to the display of the mobile device; and based on the determining, terminating the performance of the action by the mobile device.

15. A system comprising:

control circuitry configured to:

maintain a 3D map of an environment, the map indicating respective 3D locations of each of a plurality of camera devices in the environment, wherein each of the plurality of camera devices is capable of capturing video data of the environment;

analyze first video data from the plurality of camera devices to identify:

(a) a 3D location of a user in the environment, wherein identifying the 3D location of the user is based on:

estimating a trajectory of the user based on prior data received from the plurality of cameras; and determining, based on the estimated trajectory of the user, that the 3D location of the user is in a blind spot comprising a region in the 3D map of the environment in which no camera devices are present; and (b) a 3D location of a mobile device in the environment;

update the 3D map of the environment indicating the 3D location of the user and the 3D location of the mobile device, wherein the 3D map of the environment comprises a plurality of reference data structures;

triangulate a gaze of the user located in the blind spot based on:

calculating a geometry of the blind spot with respect to the 3D map of the environment;

projecting a line of sight from the user in the blind spot based on the calculated geometry of the blind spot and the estimated trajectory of the user; and determining a collision between the projected line of sight with a reference data structure of the plurality of data reference structures corresponding to the mobile device;

determine that the gaze of the user is directed to a display of the mobile device based on the triangulating; and input/output circuitry configured to:

based on the determining that the gaze of the user is directed to the display of the mobile device, cause the mobile device to perform an action.

16. The system of claim 15, wherein the first video data includes at least one of 3D location data of the user or 3D location data of the mobile device.

17. The system of claim 15, wherein the mobile device in the environment is capable of capturing video data of the environment.

18. The system of claim 17, wherein the gaze is further determined based on second video data from the plurality of camera devices that includes at least one of eye movement data or head position data of the user captured by at least one of the plurality of devices or by the mobile device; and wherein analyzing the second video data from the plurality of camera devices in combination with cross-referencing the updated 3D map of the environment is based on:

receiving, from each of the plurality of camera devices and the mobile device, the at least one of eye movement data or head position data of the user;

projecting a line of sight of the user based on cross-referencing the at least one of eye movement data or head position data of the user from each of the plurality of camera devices and the mobile device and using the updated the 3D map; and triangulating the gaze of the user based on the cross-referenced line of sight in the updated 3D map.

19. The system of claim 18, wherein the 3D map of the environment comprises a plurality of reference meshes, wherein at least one of the plurality of reference meshes corresponds to the mobile device; and wherein the determining that the gaze of the user is directed to the display of the mobile device is further based on:

determining a focal point of the triangulated gaze of the user; and determining a collision of the focal point with the at least one of the plurality of reference meshes corresponding to the mobile device.

20. The system of claim 15, wherein the 3D map of the environment comprises a plurality of reference meshes, wherein at least one of the plurality of reference meshes comprises a collision volume corresponding to a particular 3D location in the environment.

* * * * *